United States Patent

Guenter et al.

[11] Patent Number: 5,982,389
[45] Date of Patent: Nov. 9, 1999

[54] GENERATING OPTIMIZED MOTION TRANSITIONS FOR COMPUTER ANIMATED OBJECTS

[75] Inventors: Brian K. Guenter; Charles F. Rose, III, both of Redmond; Michael F. Cohen, Seattle; Robert E. Bodenheimer, Jr., Redmond, all of Wash.

[73] Assignee: Microsoft Corporation, Redmond, Wash.

[21] Appl. No.: 08/669,032

[22] Filed: Jun. 17, 1996

[51] Int. Cl.⁶ .................................................. G06F 15/00
[52] U.S. Cl. .................................................. 345/474
[58] Field of Search .................................. 345/743, 744, 345/745, 473, 474, 475

[56] References Cited

U.S. PATENT DOCUMENTS

| | | | |
|---|---|---|---|
| 4,600,919 | 7/1986 | Stern | 340/725 |
| 5,267,154 | 11/1993 | Takeuchi et al. | 395/119 |
| 5,594,856 | 1/1997 | Girard | 395/173 |
| 5,692,117 | 11/1997 | Berend et al. | 395/152 |

OTHER PUBLICATIONS

Zhao and Badler, "Inverse Kinematics Positioning Using Nonlinear Programming for Highly Articulated Figures," *ACM Transactions on Graphics*, vol. 13, No. 4, pp. 313–336 (Oct. 1994).

Witkin and Kass, "Spacetime Constraints," *Computer Graphics*, vol. 22, No. 4, pp. 159–168 (Aug. 1988).

Cohen, "Interactive Spacetime Control for Animation," *Computer Graphics*, vol. 26, No. 2, pp. 293–302 (Jul. 1992).

Liu et al., "Hierarchical Spacetime Control," *Computer Graphics Proceedings*, Annual Conference Series, pp. 35–42 (1994).

Platt, "Whuppa–whuppa whuppa Eeeeeeeeeee! Krrr-roooom!," *Wired*, pp. 170–173, 217–218, 220 (Jun. 1995).

Maestri, "Capturing Motion," *Computer Graphics World*, vol. 18, No. 12, p. 47 (Dec. 1995).

Balafoutis and Patel, *Dynamic Analysis of Robot Manipulators: A Cartesian Tensor Approach*, Chapter 5, pp. 147–148, Appendix D, pp. 283–285, Kluwer Academic Publishers (1991).

*Primary Examiner*—Phu K. Nguyen
*Attorney, Agent, or Firm*—Klarquist Sparkman Campbell Leigh & Whinston, LLP

[57] ABSTRACT

A method and system which simplifies the process of constructing new basis motions and transitions between them for animation of articulated figures with many degrees of freedom using existing basis motion data. The system uses an interpreter of a motion expression language called motion algebra to allow a user to manipulate basis motion data, break it into components, and reassemble it into new, more complex motions. The system provides two methods for generating motion: motion transition generation and cyclification. Motion transition generation uses a combination of space/time constraints and inverse kinematic constraints to generate transitions between basis motions. These transitions minimize the torque required while maintaining kinematic constraints. A fast dynamics formulation makes it possible to use spacetime constraints on systems with many degrees of freedom. Cyclification helps to eliminate discontinuities in cyclic motions and distributes the discontinuity error over an entire time interval.

30 Claims, 11 Drawing Sheets

44 TOTAL JOINT
DEGREES OF FREEDOM
(ROOT POSITION 48 HAS 6 DOF)

44 TOTAL JOINT
DEGREES OF FREEDOM
(ROOT POSITION 48 HAS 6 DOF)

FIG. 7
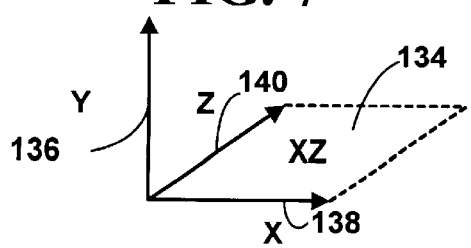
FIG. 8A
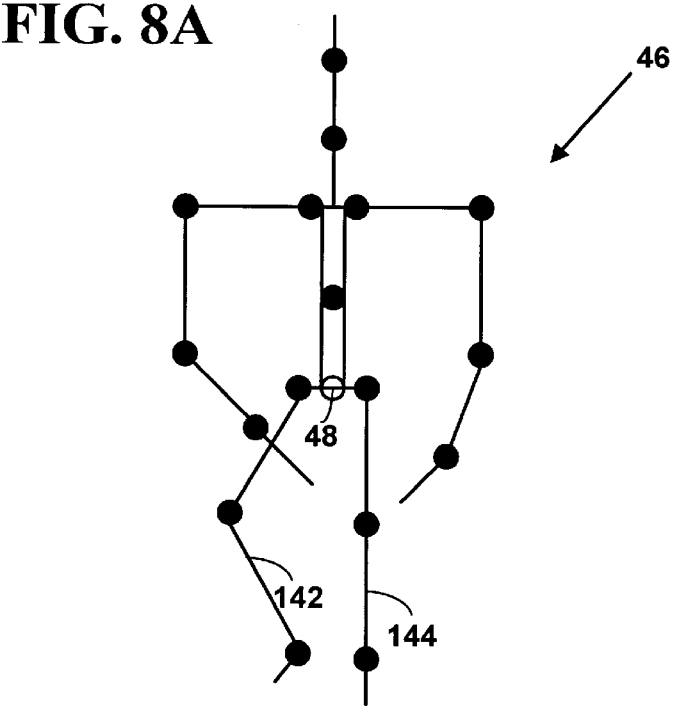
FIG. 8B
FIG. 8C
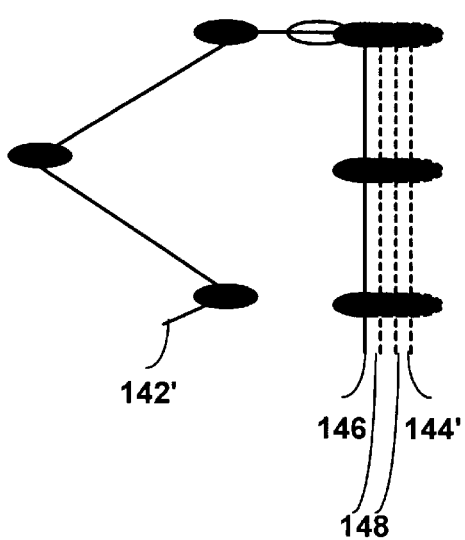
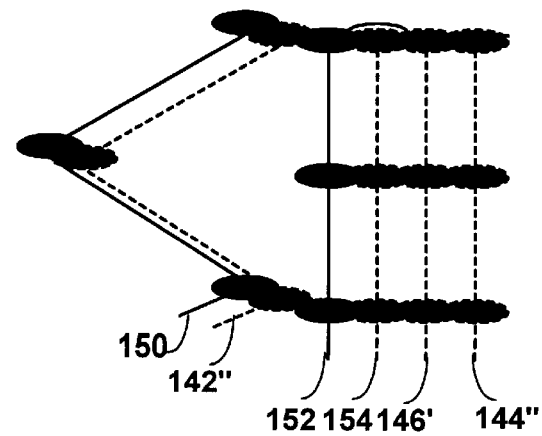

GENERATING OPTIMIZED MOTION TRANSITIONS FOR COMPUTER ANIMATED OBJECTS

FIELD OF THE INVENTION

This invention relates to the animation of three-dimensional graphical objects. More specifically, the present invention relates to a method and system for generating optimized motions and motion transitions for three-dimensional graphical animated objects.

BACKGROUND AND SUMMARY OF THE INVENTION

Interactive animated computer generated graphics (e.g., computer video games) which feature realistic three-dimensional animated human characters are becoming increasingly popular. As the speed and processing power of microprocessors continues to increase, the rendering quality for the interactive animated computer generated graphics has increased significantly. Measured in terms of the number of graphics primitives processed (e.g., polygons per second), the complexity of the graphics shading and textures used, the overall quality of animated three-dimensional (3D) human characters does not approach live-action video standards. However, the accuracy by which interactive computer generated animated graphics represent 3D animated human characters can be improved which significantly enhances the emotional impact and believability of animated applications such as video games for a user.

During a video game, a user is presented with a wide variety of situations (e.g., a character being chased, striving for a goal, etc.). To be realistic, the user of a video game with animated 3D human characters must be able to change the movement of the animated 3D human character substantially at any time in response to a variety of situations. The animated characters should also move in ways that accurately mimic the way human beings move in similar situations. The user response is dependent on a large number of factors (e.g., the skill of the user, the level of difficulty of the video game presented or chosen by the user, the particular segment of the video game the user is playing, etc.). Presented with the same situation in a video game N-number of times, the user may make N-number of choices, and expect the animated human character to respond realistically to each of these N-number of choices. Responding to any of a large number of user choices at any instant of time creates a degree of uncertainty for moving an animated 3D character for video games that is not present when animated 3D characters are produced for non-interactive or fixed video applications such as television or motion pictures. For non-interactive television and motion pictures the motion of animated 3D characters between the image frames is pre-defined to high degree of certainty, which is not true for video games under the control of a user.

Producing realistic animated 3D character motion for video games and other interactive applications presents a number of challenging problems. Existing 3D animation tools developed primarily for television, video and motion picture animation provide support for creating a single linear stream of motion data where the entire motion of an animated 3D character is planned in advance by a human animator and computed off-line (i.e., independently of when the animation is played or presented and not in real-time relative to the presentation of the animation to the user). Hand animation using existing 3D animation tools is very labor intensive, expensive and slow.

Video games with animated 3D characters under the control of a user cannot use such tools because of the real-time inputs by a user and the real-time computations required to move the animated character in response to such inputs. The entire motion of an animated 3D character also cannot be planned or created in advance because responses a human user might input during the course of the video game are too numerous to predict. In addition, developers who create interactive video games typically have much smaller budgets than television, video, or motion picture productions do and must provide a wide variety of entertainment (e.g., many different scenes and scenarios) to justify the purchase price of the video game. This greatly increases the difficulty of crafting animation for interactive applications since more 3D human character animation manipulation has to be done for a video game, but at much lower cost than is typical for television, video, or a motion picture production.

As is known in the art, the generation of a small set of high-quality motions, called basis motions, makes the creation of animated 3D human characters easier. For example, basis motions might be walk cycles, arm waves, kicks, etc. There are several companies including Acclaim Studios, in Glen Cove, N.Y., Ascension Technology in Burlington, Vt., Biovision, in San Francisco, Calif., Homer and Associates, in Hollywood, Calif., Polhemus, in Colchester, Vt. and others which produce basis motion data using a human model that includes human body segments (e.g., trunk, arms, legs, etc.) and the human joints which couple the segments (e.g., hips, elbows, wrists, shoulders, etc.).

A typical technique used to produce such basis motions for a model of a human being is to attach multiple electrical motion sensors (e.g., inertia sensors) at the joints and body segments of a person. The person goes through a set of motions (e.g., walks, runs, waves, kicks, etc.) and the sensors record the motions as a series of basis motion data points for each motion. This conventional manner of capturing basis motion data and converting it into a usable format is very expensive.

The generated basis motions include multiple degrees of freedom for each joint in the human body model. Motion degrees of freedom describe an allowable angular motion for a joint with respect to the segment to which the joint is attached. The number of motion degrees of freedom is the number of orthogonal axes about which the joint axis is free to rotate about the segment. Basis motions also include up to three position degrees of freedom to establish the position of the entire figure.

Motion capture data for a graphical object model is produced with three motion degrees of freedom for each joint, and sometimes three position degrees of freedom. For example, Ascension Technology and Polhemus produce six degrees of freedom, measuring three positional coordinates of a joint position (X,Y,Z) and three motion or orientation angles of the joint (e.g., pitch, roll, and yaw.) However, only a small number of human joints actually have three motion degrees of freedom (e.g., the shoulder joint). Most human joints only have one or two motion degrees of freedom. The motion degrees of freedom in the basis motions for a majority of the joints of a basis motion used for a human body model allow the animated character to move joints in ways that are impossible for a real person. These extra degrees of motion freedom make the 3D human character less realistic and make it more computationally expensive to use such basis motions since anatomically extraneous degrees of freedom are used in calculations to determine the motion of the animated 3D human character, even though real human joints cannot move in a similar manner.

The individual basis motions (e.g., walking, waving, etc.) generated for a model of the human body are often combined to form a composite motion (e.g., waving while walking). The composite motion typically requires that a transition motion be generated between the individual basis motions. The transition motions should provide smooth transitions between the individual basis motions. For example, a walking basis motion and a running basis motion are combined to animate a walking 3D human character that begins to run. If a high quality transition motion is not properly generated between the walk and the run basis motions, the animated 3D human character would exhibit a very jerky and unrealistic transition between the walking and the start of the running. The animated 3D human character may appear to instantaneously "leap" from the walk into running, which would be an inaccurate representation of the motion of a real person. Thus, it is important to properly generate motion transitions between individual basis motions.

The generation of motion with spacetime constraints is discussed by Andrew Witken and Michael Kass in "Spacetime Constraints," Proceedings of SIGGRAPH'88, August 1988, pages 159–168, and the generation of motion with inverse kinematics is discussed by Jianmin Zhao and Norman I. Balder in "Inverse Kinematics Positioning Using Nonlinear Programming for Highly Articulated Figures" ACM Transactions on Graphics, October 1994, Volume 13, Number 4, pages 313–336.

In the context of 3D character animation, the "space" in spacetime refers to the generalized coordinates that define an animated figure's position (e.g., the global position in space defined by position coordinates (X,Y,Z)). The values of this position vary across "time" and are represented by a function of time. Kinematics refers to modeling an animated figure with a set of rigid segments connected by joints. Joint angles define the geometric relationship between two adjacent rigid segments. Given a set of joint angles, the configuration of the segments of an animated figure can be computed. Inverse kinematics refers to finding a set of joint angles given a desired position and orientation of some segment of the figure. The spacetime and inverse kinematic techniques described in the papers listed above are limited to animation models with a small number of joints (e.g., 5), each with a small number of motion degrees of freedom (e.g., 4–6) and typically require a large amount of computation time to correctly generate transition motions. As a result, these techniques are typically not suited for real-time animation of complex graphical characters (e.g., a 3D human character).

The generation of motion transitions has also been done with motion transition processes including dynamic time warping, Fourier interpolation, and multi-resolution signal processing. However, these techniques result in transition motions which do not have realistic dynamic motion qualities and which do not satisfy kinematic constraints.

In accordance with the present invention, the problems associated with interactive animated 3D human characters are overcome. The present invention includes a method and system for generating new motions by generating motion transitions between basis motions and by cyclifying existing basis motions while maintaining constraints.

The method includes selecting a computer object model (i.e., any object real or imaginary that can be modeled with acts and symbolic represenations of operations that are preformed by a computer) for a graphical object to be animated, where the computer object model includes a body or trunk with multiple segments coupled at joints attached to the body that are moveable with multiple allowable degrees of freedom, and one or more of the joints are moveable with fewer than all of the allowable degrees of freedom. The computer object model is applied to a set of basis motions to create a processed set of basis motions. Two or more individual basis motions from the set of processed basis motions are selected to create an initial composite motion. A set of motion transitions is generated between the selected basis motions, and a final composite motion is assembled from the initial composite motion and the generated set of motion transitions. The final composite motion is used to animate a 3D graphical object (e.g., a 3D animated human character).

In the present invention, the computer object model is an optimized model of a human body which includes removing anatomically impossible motion degrees of freedom from the joint data in the basis motions to decrease the degrees of freedom in the basis motions. The optimized basis motions are decreased in size thereby improving the computational speed when the optimized basis motions are used in the generated composite motions. The motion transition generation process includes a combination of a fast spacetime constraints optimization process and an inverse kinematic optimization process to generate transitions between the optimized basis motions. This process generates motion transitions which minimize the torque needed to change an animated object from one optimized basis motion to another. The method allows use of spacetime constraints and inverse kinematics on an animated object with a large number of joints and many degrees of freedom.

The method of the present invention also includes generating motion cyclification for an optimized cyclic basis motion. A cyclic basis motion is a motion unit from which a repetitive or cyclified motion is formed (e.g., walking is a repetitive sequence of a cyclic basis motion that includes single successive right and left foot steps.). A cyclic basis motion typically does not begin and end with the character segments in the same positions or orientations. Concatenation of such basis motions creates perceptible discontinuities at the beginning and end of each cycle. Motion cyclification modifies cyclic basis motions so that character segments at the beginning and end have matched positions and orientations. This reduces cyclic motion discontinuities at the beginning and end of each motion cycle.

The present invention includes a computer software program which has an interpreter of a motion expression language called "motion algebra" to allow the user to manipulate un-optimized basis motion data, disassemble it into components, optimize it, and reassemble it into new, more complex, optimized composition motions. In addition to such editing facilities provided by the motion expression editor, the present invention includes computer-executed methods for generating motion transitions and motion cyclifications described above.

The present invention also includes a user interface with an animation preview display window and graphical controls for displaying and controlling animation images, an animation editor display window and graphical controls for displaying and controlling a motion expression editor, and an animation control display window and graphical display for displaying and controlling animation image parameters relating to the animation images. However, the user interface for the present invention can also include more or fewer windows and graphical controls.

The system for the present invention includes a database for storing optimized basis motions, a motion expression editor for manipulating the optimized basis motions, a motion transition module for generating motion transitions between two or more basis motions, a motion cyclification error reduction module for reducing motion cyclification errors for selected ones of the basis motions, and a user interface as was described above. However, the system for the present invention can also include more or fewer system components.

The present invention has been used to create optimized basis motions, optimized motion cyclifications, and optimized motion transitions for a 3D animated human character using a human body model having joints with a total of 44 motion degrees of freedom. The method and system significantly reduces the time and human labor required to animate a 3D graphical object and significantly reduces the overall cost for developing interactive computer applications, such as video games, which use animated 3D graphical characters.

The foregoing and other features and advantages of the present invention will be more readily apparent from the following detailed description, which proceeds with reference to the accompanying drawings.

BRIEF DESCRIPTION OF THE DRAWINGS

FIG. 7 is a block diagram illustrating the (X,Y,Z) coordinates of the inverse kinematics process of a preferred embodiment of the present invention.

FIG. 8A is a block diagram of the human body model shown in FIG. 3 with one leg bent.

FIG. 8B is a block diagram illustrating a motion transition of the legs of the human body model shown in FIG. 8A using an optimized inverse kinematics process.

FIG. 8C is a block diagram illustrating a motion transition of the legs of the human body model shown in FIG. 8B without using an optimized inverse kinematics process.

FIG. 9A is a block diagram illustrating a transition character configuration for the human characters shown in FIG. 9A.

DETAILED DESCRIPTION OF A PREFERRED EMBODIMENT

Figure 1:
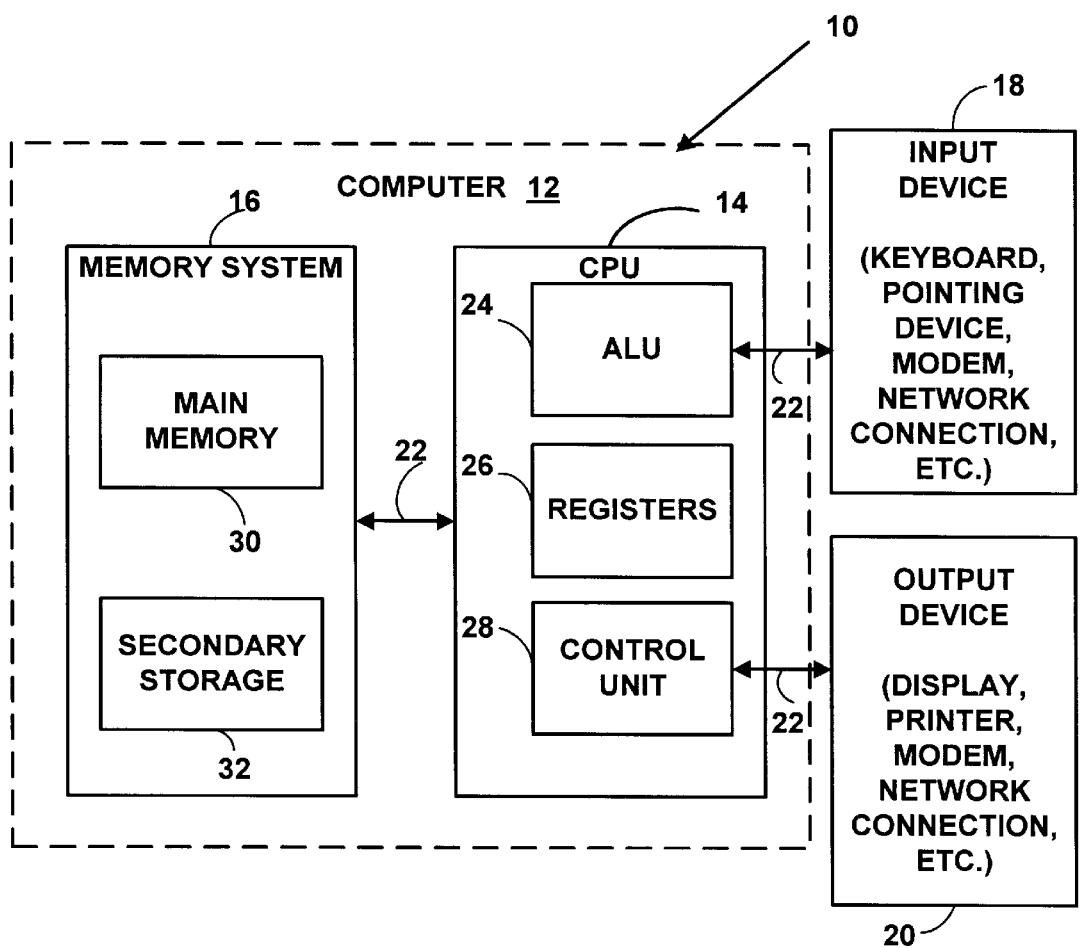
FIG. 1 is a block diagram of a computer system used to implement a preferred embodiment of the present invention.

Referring to FIG. 1, an operating environment for a preferred embodiment of the present invention is a computer system 10 with a computer 12 that comprises at least one high speed processing unit (CPU) 14, in conjunction with a memory system 16, an input device 18, and an output device 20. These elements are interconnected by a bus structure 22.

The illustrated CPU 14 is of familiar design and includes an ALU 24 for performing computations, a collection of registers 26 for temporary storage of data and instructions, and a control unit 28 for controlling operation of the system 10. Any of a variety of processors, including those from Digital Equipment, Sun, MIPS, IBM, Motorola, NEC, Intel, Cyrix, AMD, Nexgen and others are equally preferred for CPU 14. Although shown with one CPU 14, computer system 10 may alternatively include multiple processing units.

The memory system 16 includes main memory 30 and secondary storage 32. Illustrated main memory 30 is high speed random access memory (RAM) and read only memory (ROM). Main memory 30 can include any additional or alternative high speed memory device or memory circuitry. Secondary storage 32 takes the form of long term storage, such as ROM, optical or magnetic disks, organic memory or any other volatile or non-volatile mass storage system. Those skilled in the art will recognize that memory 16 can comprise a variety and/or combination of alternative components.

The input and output devices 18, 20 are also familiar. The input device 18 can comprise a keyboard, mouse, pointing device, audio device (e.g. a microphone, etc.), or any other device providing input to the computer system 10. The output device 20 can comprise a display, a printer, an audio device (e.g. a speaker, etc.), or other device providing output to the computer system 10. The input/output devices 18, 20 can also include network connections, modems, or other devices used for communications with other computer systems or devices.

As is familiar to those skilled in the art, the computer system 10 further includes an operating system and at least one application program. The operating system is a set of software which controls the computer system's operation and the allocation of resources. The application program is a set of software that performs a task desired by the user, making use of computer resources made available through the operating system. Both are resident in the illustrated memory system 16.

In accordance with the practices of persons skilled in the art of computer programming, the present invention is described below with reference to acts and symbolic representations of operations that are performed by computer system 10, unless indicated otherwise. Such acts and operations are sometimes referred to as being computer-executed. It will be appreciated that the acts and symbolically represented operations include the manipulation by the CPU 14 of electrical signals representing data bits which causes a resulting transformation or reduction of the electrical signal representation, and the maintenance of data bits at memory locations in memory system 16 to thereby reconfigure or otherwise alter the computer system's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, and any other volatile or non-volatile mass storage system readable by the computer 12. The computer readable medium includes cooperating or interconnected computer readable media, which exist exclusively on computer system 10 or are distributed among multiple interconnected computer systems 10 that may be local or remote.

Figure 2:
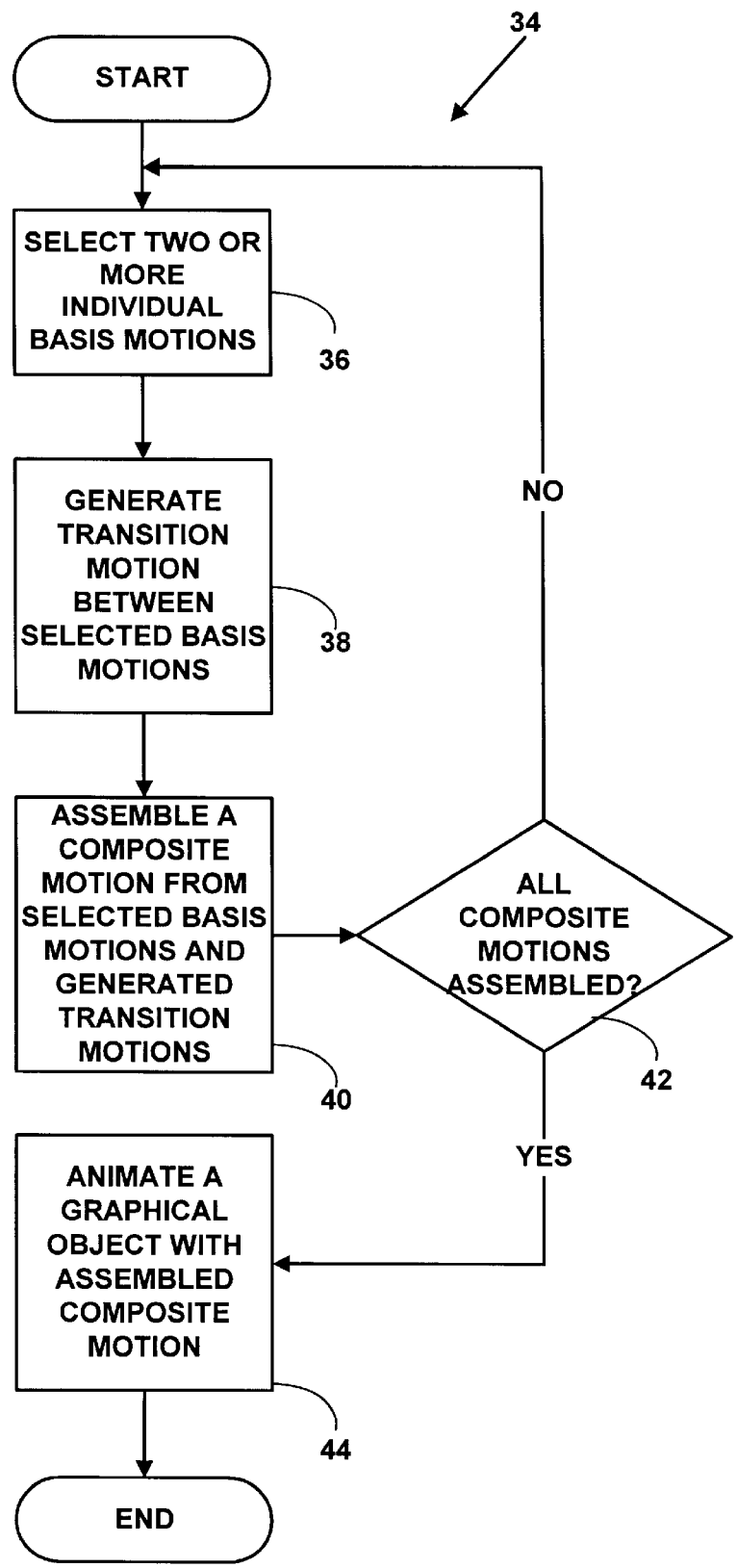
FIG. 2 is a flow diagram illustrating an animation process.

As is shown in the flow chart in FIG. 2, the present invention includes an animation process 34 to animate one or more graphical objects. Animation process 34 includes selecting two or more individual basis motions from a set of basis motions 36, generating one or more motion transitions between the selected individual basis motions 38, and assembling a composite motion 40 from the selected individual basis motions and the generated motion transitions. Process steps 36–40 are repeated 42 as many times as necessary to create the composite motions which are used to animate a graphical object 44. Process steps 36–44 will be explained in detail below. Optimizing basis motion data For purposes of illustration, the graphical object being animated is a three-dimensional (3D) human character described by a computer object model (i.e., described by a human body model). There are several companies including Acclaim Studios, in Glen Cove, N.Y., Ascension Technology in Burlington, Vt., Biovision, in San Francisco, Calif., Homer and Associates, in Hollywood, Calif., Polhemus, in Colchester, Vt. and others that produce basis motion data using a model of a human body which includes human segments (e.g., torso, arms, legs, etc.) and the human joints which couple the segments. However, the present invention is not limited to data gathered with commercial motion capture techniques and can be used, for example, with hand-animated basis motions. The present invention is also not limited to modeling 3D human characters, but rather can be used for any graphical object which includes a body or trunk, one or more rigid segments connected to the body, and one or more joints connecting the rigid segments (e.g., non-human animals, mechanical devices, robots, etc.). The body may also be composed of multiple rigid segments, with one or more joints connecting the segments.

Before they are used in a preferred embodiment of the present invention, basis motions are first optimized by preprocessing. However, the present invention can also be used with basis motion data that is already optimized, thereby skipping the preprocessing step. It can also be used with unoptimized data but will execute slower due to the computations required for the extraneous degrees of freedom.

The 3D human character is described by an computer object model that includes joints and segments of a human body, as is explained below. The computer object model (i.e., any object real or imaginary that can be modeled with acts and symbolic represenations of operations that are preformed by a computer 10) for the human body is selected based on the desired degrees of freedom for each of the joints in the human body. However, other selection criteria could also be used.

A preferred human body model has a trunk or body, appendages attached to and supporting the trunk called supporting appendages (e.g., legs), and appendages attached to and not supporting the trunk called non-supporting appendages (e.g., arms, head, etc.). The supporting and non-supporting appendages are also referred to as supporting and non-supporting limbs. The distinctions can also change during an animation sequence. For example, an animated human figure performing a cartwheel will have its support limbs change from legs to arms, and then back to legs.

Motion capture data for a human body model is typically produced with up to six degrees of freedom for each joint. The six degrees of freedom include three positional degrees of freedom and three rotational degrees of freedom. For example, Ascension Technology and Polhemus produce six degrees of freedoms for each joint of an object, measuring three positional coordinates of a joint position (X,Y,Z) and three motion or orientation angles of the joint (e.g., pitch, roll, and yaw.). Rotational degrees of freedom describe an allowable angular motion for a joint with respect to a segment to which the joint is attached. The number of rotational degrees of freedom is the number of orthogonal axes about which the joint axis is free to rotate relative to the segment. However, only a few human joints actually have three rotational degrees of freedom (e.g., the shoulder joint, the hip joint, etc.). Most joints have only one or two motion degrees of freedom. Anatomically extraneous degrees of freedom can introduce inaccurate motions when generating motion transitions since the animated human character may move in ways that are impossible for a real human to move. In addition, these extraneous degrees of freedom significantly increase the requirement for computational time and resources during the animation process.

Figure 3:
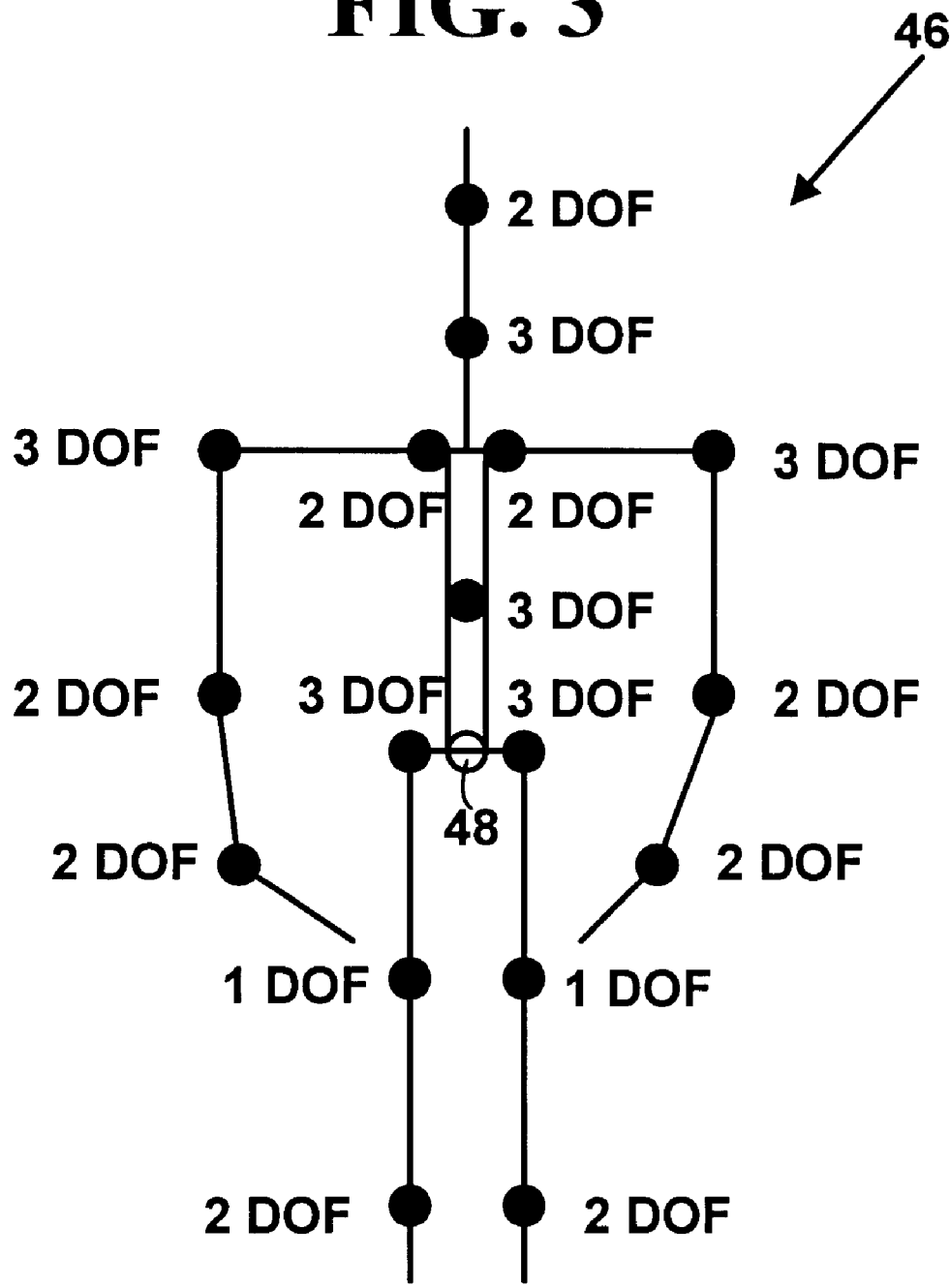
FIG. 3 is a block diagram illustrating the degrees of freedom for each joint included in a human body model for an animated human character.

As is shown in FIG. 3, a preferred human body model 46 has a total of 44 degrees of freedom (38 motion degrees of freedom for the seventeen joints, and 6 degrees of freedom at a joint for a root position 48). The seventeen joints include pairs of hip, knee, ankle, inner shoulder, outer shoulder, elbow, wrist, mid-trunk, neck, and head joints. However, other human body models with or without a root position, and with more or fewer degrees of freedom for joints can alternatively be used. The root position 48 is located between the hips of the human body model 46. The root position has three positional degrees of freedom used for positioning and orienting the entire animated 3D human character body, and three motion degrees of freedom. The root position 48 can be alternatively relocated to other locations within the human body model 46.

As is known in the art with other animation processes for human body models, the joints of human body model 46 are modeled as revolute joints. This assumption is not a precise characterization of all human body joints especially for such joints as the knee which can more accurately be modeled as a four bar linkage in the saggital plane (i.e., the median longitudinal plane of the body or parallel to it). Since the errors introduced by making this assumption are typically small, in a preferred embodiment of the present invention all joints in human body model 46 are assumed to be revolute. However, other more accurate representations could also be made for each of the joints and used in accordance with this invention.

Optimized (i.e., degree of freedom reduced) basis motions are created with an optimization process which minimizes the angular and positional degrees of freedom in the raw basis motion data (e.g., basis motions by Ascension Technology or Polhemus, etc.) to the degrees of freedom desired by the internal computer ojbect model (e.g., human body model 46 in FIG. 3). The optimization process used is a nonlinear process utilizing joint angle gradient quantities. A similar optimization process is discussed by Jianmin Zhao and Norman I. Badler in "*Inverse Kinematics Positioning Using Nonlinear Programming for Highly Articulated Figures*," ACM Transactions on Graphics, Vol. 13, No. 4, October 1994, pages 313–336. However, other optimization processes can also be used.

The un-optimized raw basis motion data and the computer object model (e.g., the human body model from FIG. 3) are used with the nonlinear optimization process referred to above to produce optimized basis motion data. The optimized basis motion data eliminates degrees of freedom which are not actually present in the human body joints according to human body model 46, and minimizes angular and positional error for each of the human body joints contained in the basis motions. Hereinafter, the basis motions used are optimized basis motions using the optimization process just described. However, un-optimized basis motion could also be used, as well as basis motion data optimized with other optimization processes, or which use a human body model other than the one shown in FIG. 3. Non-human body models could also be used for generating non-human actors (e.g., animals, aliens, or robots).

Basis Motion Representation and Manipulation

The present invention uses a motion algebra to minimize the complexity of working with basis motions which involve many degrees of freedom. The motion algebra is a flexible yet simple way of representing and manipulating basis motions. Basis motions in the motion algebra are defined with primitive objects including: Intervals (I); Motion Algebra Degrees of Freedom( ADOF); and Motion Units, (MU). However, more or fewer primitive objects could also be used. These primitive objects are described in a pseudo Backus-Naur Form (BNF) grammar notation below:

Interval=($f_1, \ldots f_n, t_s, t_f$)

ADOF=Interval | ADOF, Interval | $\epsilon$

MU=array 1 ... n[ADOF]

An Interval (I), is a list of scalar functions of time ($f_1, \ldots f_n$), plus a start time, $t_s$, and a stop time, $t_f$. The scalar functions of time define a motion degree of freedom included in a basis motion over the time Interval $t_s$–$t_f$. An Algebra Degree of Freedom (ADOF), is a list of Intervals, or "|" an ADOF and an Interval, or "|" the empty string "$\epsilon$". An ADOF defines the value over time of one of the degrees of freedom of animated graphical object. A Motion Unit (MU) is an array of ADOFs which defines the ADOF value over some, but not necessarily all, of the degrees of freedom. There are three kinds of operations defined on these primitive objects: set operations, function operations, and insert and delete operations. The set operations are intersection, "∧", undefine"–" and composition "+". These operations are defined on Intervals $I_1$ and $I_2$ as follows (without loss of generality assume $t_3 > t_1$):

$I_1 = (f_1, \ldots, f_n, t_1, t_2)$ $I_2 = (g_1, \ldots, g_m, t_3, t_4)$ where Interval $I_1$ is a list of scalar functions of time ($f_1 \ldots f_n$) plus a start time, $t_1$, and a stop time, $t_2$, and Interval $I_2$ is a list of scalar functions of time ($g_1 \ldots g_m$) plus a start time, $t_3$, and a stop time, $t_4$. Using the Intervals $I_1$ and $I_2$, the intersection operation is defined by:

$$I_1 \wedge I_2 = \begin{cases} \varepsilon & t_2 \leq t_3 \\ (f_1, \ldots, f_n, g_1, \ldots, g_m, t_3, t_2) & t_3 < t_2, t_2 < t_4 \\ (f_1, \ldots, f_n, g_1, \ldots, g_m, t_3, t_4) & t_3 < t_2, t_4 < t_2 \end{cases}$$

Figure 4A:
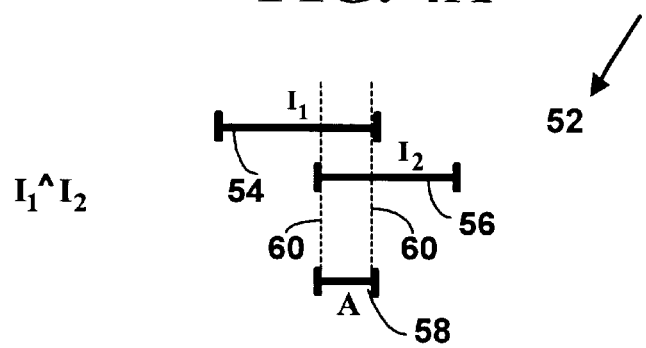
FIGS. 4A–4C are block diagrams illustrating the intersection, undefine, and composition operation of a preferred embodiment of the present invention.

As is shown in FIG. 4A, the intersection operation "∧" 52 takes two Intervals $I_1$ 54 and $I_2$ 56 as arguments and returns an Interval A 58 where the two Intervals $I_1$ and $I_2$ intersect. The portions of the two Intervals $I_1$ and $I_2$ which intersect are shown by the dashed lines 60.

Figure 4B:
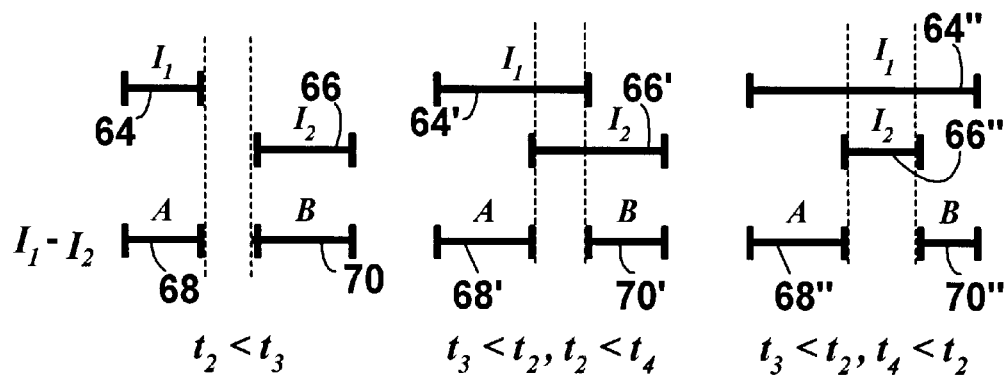

Using the Intervals $I_1$ and $I_2$, the undefine operation "–" is defined by:

$$I_1 - I_2 = \begin{cases} (f_1, \ldots, f_n, t_1, t_2), (g_1, \ldots, g_m, t_1, t_2) & t_2 \leq t_3 \\ (f_1, \ldots, f_n, t_1, t_3), (g_1, \ldots, g_m, t_2, t_4) & t_3 < t_2, t_2 < t_4 \\ (f_1, \ldots, f_n, t_1, t_3), (f_1, \ldots, f_m, t_4, t_2) & t_3 < t_2, t_4 < t_2 \end{cases}$$

where the commas "," between the Interval lists denote concatenation. As is shown in FIG. 4B, the undefine operation "–" 62 takes as arguments two Intervals $I_1$ 64 and $I_2$ 66 and returns an ADOF containing two Intervals A 68 and B 70. The effect of the undefine operator (–) is to undefine any portions of $I_1$ 64 which overlap with $I_2$ 66. In FIG. 4B, two Intervals $I_1$ 64 and $I_2$ 66 in which $t_2 < t_3$ do not overlap so the ADOF that is returned contains two Intervals A 68 and B 70 that are the original Intervals $I_1$ 64 and $I_2$ 66. With the two Intervals $I_1$ 64' and $I_2$ 66' a ADOF is returned containing two Intervals A 68' and B 70' where $t_3 < t_2$, and $t_2 < t_4$, from which the portion of the original intersecting Intervals $I_1$ 64' and $I_2$ 66' have been undefined. An intersecting area at the end of $I_1$ 64' and the beginning of $I_2$ 66' has been undefined. With the two Intervals $I_1$ 64" and $I_2$ 66" where $t_3 < t_2$, and $t_4 < t_2$, the entire Interval $I_2$ 66" has been undefined, and Interval $I_1$ 64" has been partitioned into the two Intervals A 68" and B 70".

Using the Intervals $I_1$ and $I_2$, the composition operation "+" is defined by:

$I_1 + I_2 = I_1 - I_2, I_1 \wedge I_2$

Figure 4C:
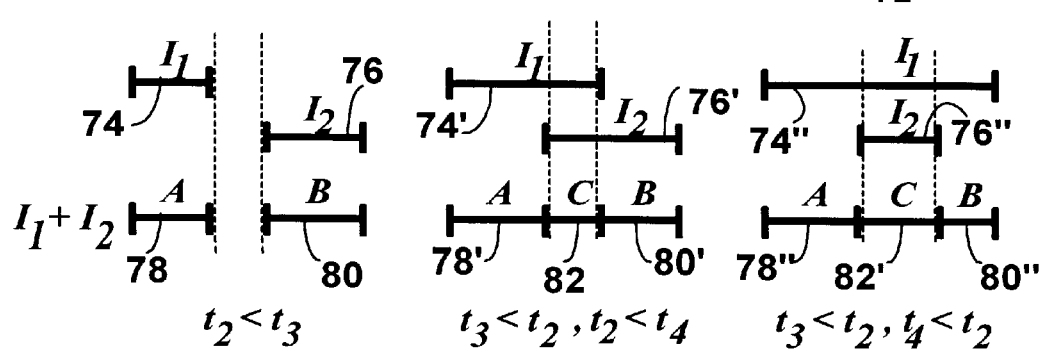

As is shown in FIG. 4C, the composition operator "+" 72 takes as arguments two Intervals $I_1$ 74 and $I_2$ 76 where $t_2 < t_3$, and returns a ADOF containing two Intervals, A 78 and B 80 (i.e., the intersection of $I_1$ 74 and $I_2$ 76 is empty), which are the original intervals $I_1$ 74 and $I_2$ 76. With Intervals $I_1$ 74' and $I_2$ 76' where $t_3 < t_2$, and $t_2 < t_4$, a ADOF containing three Intervals, A 78' and B 80' and C 82 is returned. With Intervals $I_1$ 74" and $I_2$ 76" where $t_3 < t_2$, and $t_4 < t_2$, a ADOF containing three Intervals, A 78" and B 80" and C 82' is returned.

The effect of the composition operation "+" is to replace the regions of $I_1$ and $I_2$ that were removed by the set undefine operator "–" (shown in FIG. 4B) with a new Interval C. As can be seen in FIG. 4C, there is no new Interval C where Intervals $I_1$ and $I_2$ do not overlap (i.e., $t_2 < t_3$). However, where the Intervals $I_1$ and $I_2$ do overlap, a new Interval C 82,82' is created by the composition operation "+".

The set operations identify the time regions over which two Intervals, ADOFs, or MU's are undefined (i.e. transmitting required), singly-defined, or multiply-defined (i.e., where composed motions conflict.) However, more or fewer set operations could also be used.

Function operations perform functional composition on the elements of an Interval: functions and times. For example, one of the functional operators is affine($t_s$, s, I), where $t_s$ is the start time of an Interval, s is the amount by which time should be scaled (i.e., slowed or hastened), and I is an Interval. This operator scales and translates with an affine transformation the time components of an Interval, and the time value at which the functions in that Interval are evaluated. Affine transformations are known to those in the art. Other functional operations include clip($t_s$, $t_{end}$, I) which clips out a portion of an Interval and translates the beginning of the clip back to time zero, where $t_s$ is the start time of the clip within Interval I, $t_{end}$ is the stop time of the clip of Interval I, and I is an Interval. The functional operation clip_in_place($t_s$, $t_{end}$, I) where $t_s$ is the start time of an Interval, tend is the end time of an Interval, and I is an Interval, performs the same operation as clip( ) except that it leaves the clip time unchanged. The functional operation concatenate($I_1, I_2$) puts two Intervals $I_1, I_2$ in time sequence.

The functional operator time-warp (U, I) scales and adjusts the time at which I is evaluated by applying the function U to a time t before evaluating I. This operator can achieve well-known effects like ease-in/ease-out or any other adjustments of time which can be encoded as a scalar function U. More or fewer functional operations could also be used.

The insert and delete operations are used to insert and delete primitives. Intervals can be inserted and deleted from ADOFs and ADOFs can be inserted and deleted from MUs.

The values (e.g., zeroeth, first and second time derivatives, etc.) of an Interval, ADOF, or MU are computed by an eval(t) function. If there is only one function in the Interval then the value returned by eval(t) at any time in the Interval is ƒ(t) and undefined for any time outside the Interval. If there is more than one function in the Interval then the value of the Interval is multiply-defined and eval(t) returns a list of the functions in the Interval. In this latter case, a higher level mechanism not part of the low level motion algebra definition must be invoked to determine the operative value. One of the higher level mechanisms supported is to assign different priorities to functions. Thus, the function with the highest priority is used to compute the value of the Interval. Another would be some combination of functions based upon the weights. Other higher-level schemes could also be used.

The set, function, and insert and delete operations can be applied to any Interval, ADOF, or MU. The operations are pushed down in an expression tree to the level of Intervals at which point the primitive operations (e.g., intersection, undefine, and additions) are invoked. For example, if $MU_1$ and $MU_2$ are intersected, first the ADOFs of $MU_1$ and $MU_2$ are intersected, and then the Intervals in the ADOFs are intersected. This could result in $O(n^2)$ intersection operations, in which the vast majority of which will be empty. As is known in the art, O( ) notation is used to express the asymptotic complexity of the growth rate of functions. However, a preferred embodiment of the present invention keeps the Intervals sorted by their start time so the average case computation is proportional to the logarithm of the number of Intervals in each motion times the number of Intervals which will eventually be in the intersection.

Figure 5A:
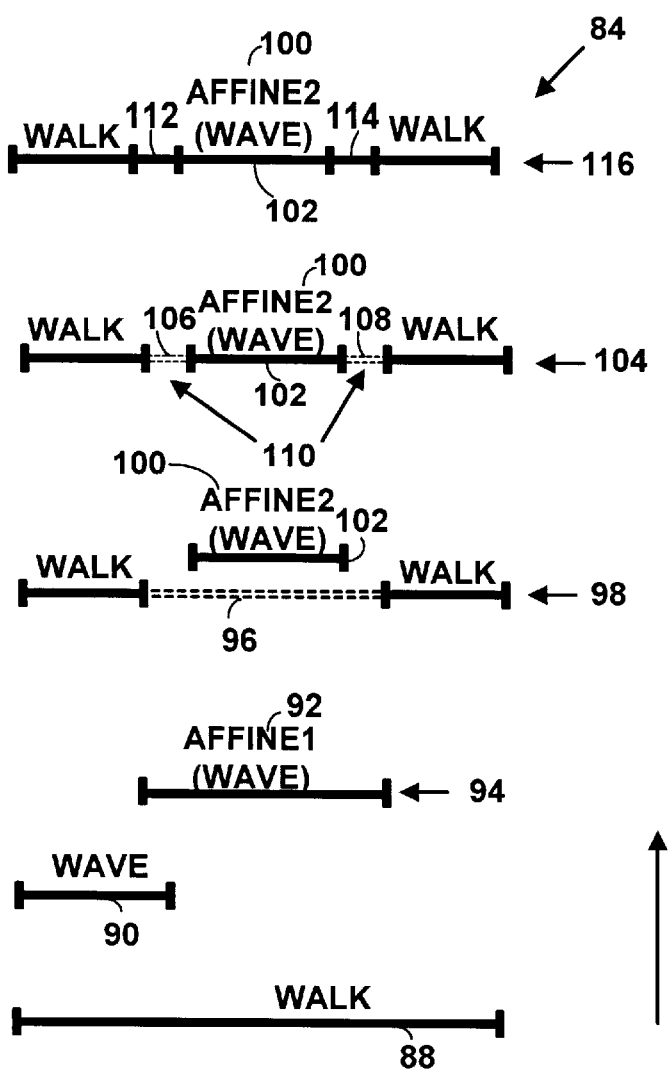
FIG. 5A is a diagram illustrating a time line view using motion algebra for a preferred embodiment of the present invention.
Figure 5B:
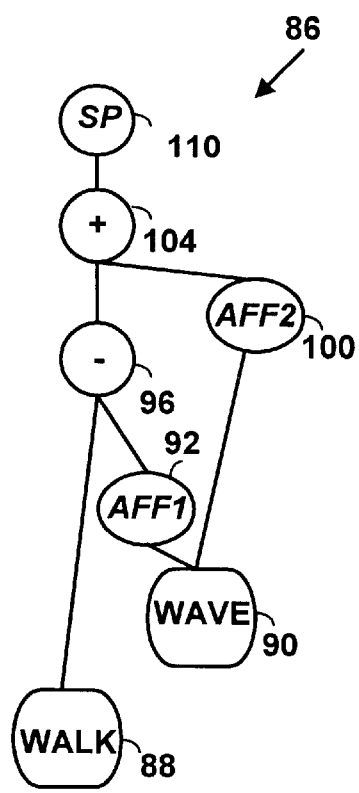
FIG. 5B is a diagram illustrating a function tree view of the time line view shown in FIG. 5A.

Complex composite motions are created easily by functional composition of simple basis motions using the set, function and insert and delete operations defined above. FIGS. 5A and 5B illustrate an example of using motion algebra operators to create a spacetime transition from a walk basis motion (i.e., including the arm-swinging component of a walk basis motion) to a wave arm basis motion (i.e., the greeting type wave basis motion) and back to a walk basis motion. It will be appreciated that the walk basis motion includes other basis motion components for legs, trunk, etc. This example is limited to arm motions for purposes of illustration.

The operation is shown in both a time line view 84 and an expression tree view 86 in FIGS. 5A and 5B, respectively. The functional representation for this operation is SP(affine2(wave)+walk−affine1(wave))

As is shown in FIG. 5A, a walk MU 88 defines all the ADOFs of the graphical human character (including root position 48) during a walking motion (e.g., swinging the arm, moving the legs, moving the hips, etc.) over a first time Interval T1. An arm wave MU 90 defines the ADOFs of a waving arm over a second time Interval T2. A first affine transformation 92 is performed on the arm wave MU 90. The first affine transformation 92 shifts and scales the arm wave MU 90 to form an affine transformed arm wave motion 94. The shifting causes arm wave MU 90 to start at a desired time, and the scaling causes the arm wave MU 90 to last for a desired duration. Transformation 92 is affine in that it allows various characteristics of the arm wave motion, such as frequency and extent to be scaled as well.

The undefine operation "−" 96 is applied to the affine transformed arm wave motion 94 to undefine it from the walk MU 88. This first affine transformation 92 undefines 96 the arm degrees of freedom of the walk MU 88 during a time that is slightly longer than the arm wave MU 90 leaving an incomplete composite motion 98. A second affine transformation 100 is applied to the wave arm MU 90 to create a second time-shifted and scaled wave arm wave MU 102. This second time-shifted transformed wave arm MU 102 is used with the composition operation "+" to create an incomplete composite MU 104 that includes two undefined regions 106,108 surrounding the time shifted wave arm MU 102. A spacetime operator 110 fills in the undefined regions 106, 108 with spacetime transition motion 112,114. The resulting composition motion MU 116, will be a smooth transition from a walking arm motion to an arm wave motion and back to a walking arm motion.

A user interface (which will be explained below) for a preferred embodiment of the present invention has the interactive equivalent of an interpreter for the motion expression language so that users can create and edit expressions easily. During editing of an MU, an expression tree is created, and the algebraic motion representation of the expression tree 86 (FIG. 5B) is stored. Each time an eval(t) operation is chosen by a user, the expression tree 86 is traversed. This makes it easy to edit any node of the expression tree (88 . . . 110) at any time. The expression tree representation is also used internally to procedurally generate more complicated types of motions, for example, composite motions. A composition motion 116 is shown in FIG. 5A.

After a user finishes editing a motion, the expression tree can be flattened into a single Interval with a single time unction by using the collapse operator. A function to represent joint angles in the human body model includes:

$q(t)=(q_1)(t), \ldots, q_n(t))$ where q(t) is a vector whose components $q_i(t)$ are the angle of joint i at time t. As is known in the art, $q_i(t)$ may be represented by B-splines and B-spline wavelets. In a preferred embodiment of the present invention, cubic B-splines are used as the basis functions for $q_i(t)$. However, other basis functions, such as B-spline wavelets, could also be used. The collapse operator does a least squares fit of a cubic B-spline curve to each of the ADOFs in the motion to create a simple motion from a composite one.

Motion Transitions

In a preferred embodiment of the present invention, motion transitions are generated for an animated 3D human character and the optimized basis motions described above. However, motion transitions may also be generated using un-optimized basis motions.

Figure 6:
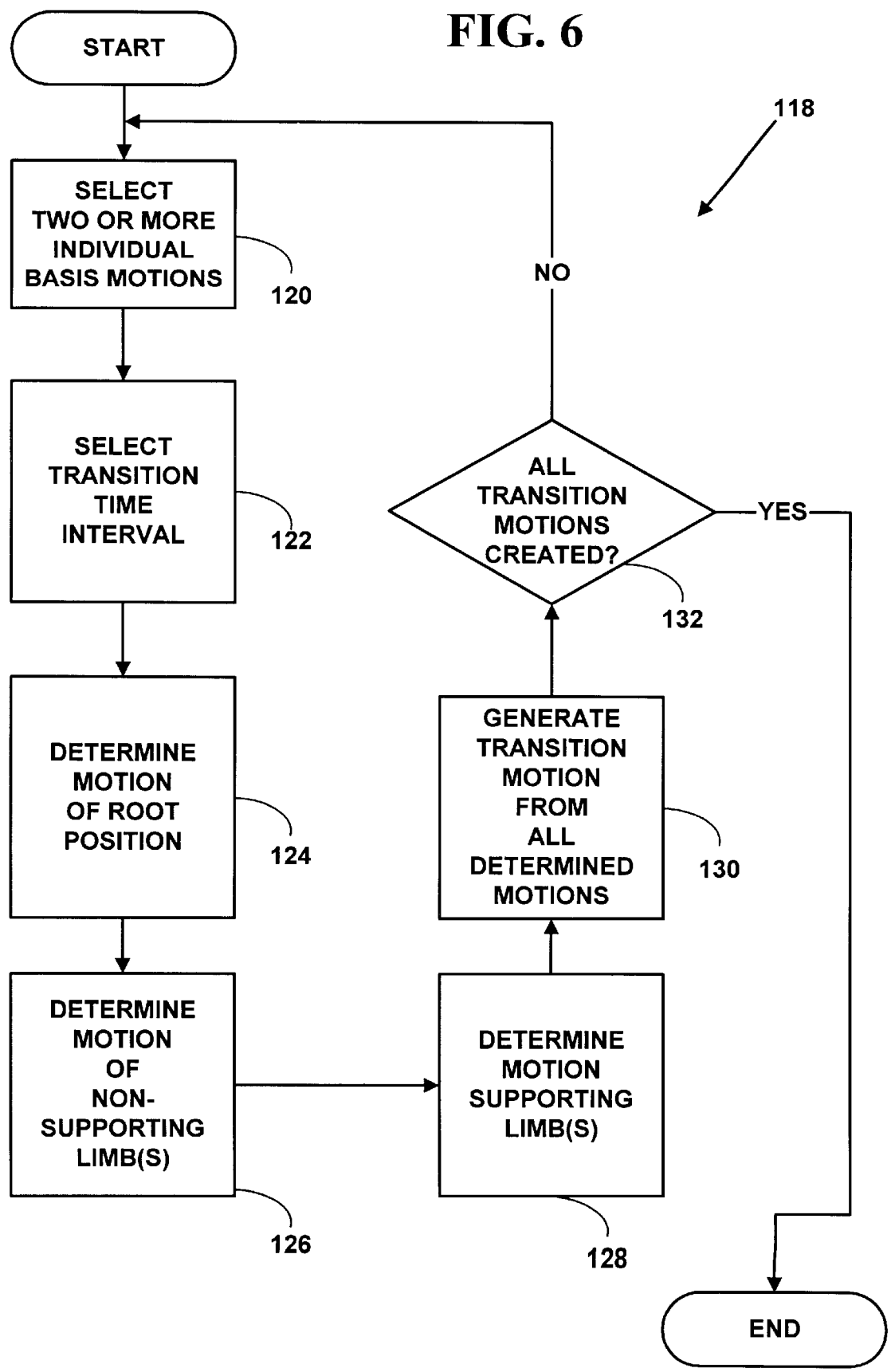
FIG. 6 is a flow diagram illustrating a motion transition process.

As is shown in the flowchart in FIG. 6, a motion transition process 118 includes selecting two or more individual optimized basis motions 120, selecting a transition time interval 122 for which one or more transition motions are generated, determining the motion or position 124 of the root position 48 (FIG. 3) with a kinematic process over the selected transition time interval, and determining the motion of all non-supporting limbs 126 with an spacetime constraints optimization process over the selected transition time interval.

The motion of supporting limbs 128 are determined with an inverse kinematics optimization process over the selected transition time. The motions of the root position, the supporting limbs, and the non-supporting limbs are combined to generate a transition motion or motions 130 between the two individual optimized basis motions. Process steps 120–130 are repeated until all desired transition motions have been generated 132. Process steps 124–128 are explained in detail below.

In the context of 3D character animation, the "space" in spacetime refers to the generalized coordinates that define the position of an animated figure (e.g., the global position in space defined by position coordinates (X,Y,Z)). The values of this position vary over "time" and are represented by a function of time. Kinematics refers to determining the relation between the configuration of a set of rigid segments and their joint angles. Joint angles define the geometric relationship between two adjacent rigid segments. Given a set of joint angles, the configuration of the segments of an animated figure can be computed. Inverse kinematics refers to finding a set of joint angles given a configuration of some of the segments in the animated figure.

In a preferred embodiment of the present invention, the user generates a motion transition by specifying four parameters: the duration of the transition, the ending time of the first motion, the start time of the second motion, and the number of B-spline coefficients used to represent each joint angle function motion during the interval. However, more or fewer parameters could also be used depending upon the degree of automation control desired.

As discussed earlier, a function to represent joint angles in the human body model includes:

$$q(t)=(q_1(t), \ldots, q_n(t))$$

where q(t) is a vector whose components are functions determining the angle of joint i at time t. As is known in the art, $q_i(t)$ may be represented by B-splines or B-spline wavelets. B-spline wavelets show good convergence properties where the number of basis functions in a single degree of freedom is large (e.g., more than 20 or 30). Given that motion transitions are typically short, good paths can be represented with 5 to 10 B-spline coefficients. Thus, the extra complexity and computation required for B-spline wavelets is usually unnecessary. In a preferred embodiment of the present invention, cubic B-splines are used as the basis functions for $q_i(t)$ for motion transitioning. However, other basis functions could be used.

Transition Motion of the Root Position

As is shown in FIG. 7, the root position 48 (FIG. 3) is defined with an x-z plane 134 as a floor with a y component 136 as an axis transverse (i.e., pointing upward from the plane) to the x-z plane 134. The x and z components 138,140 of the root position 48 are interpolated based on the velocities (or accelerations) provided by basis motions at the beginning of the transition interval and at the end of the transition interval. They component 136 of the root position 48 is linearly interpolated from an end of a first basis motion to a beginning of a second basis motion selected. The root position p(t) in the x-z plane 134 during the transition time t is represented with a kinematics process as:

$$p(t) = p(t_1) + \int_{t_1}^{t_2} \left\{ v_1 \left(1 - \frac{\alpha - t_1}{t_2 - t_1}\right) + v_2 \frac{\alpha - t_1}{t_2 - t_1} \right\} d\alpha$$

where $v_1$ and $v_2$ are the vector velocities in the x-z plane 134 of the root position 48 at the end of the first basis motion and the beginning of the second basis motion, respectively, $t_1$ and $t_2$ are the respective start and end times of the selected transition time, and is the variable of integration which varies between $t_1$ and $t_2$. This provides a $C^1$ path for the root position. A $C^1$ path is continuous in the first derivative of the path parametrizing variable, in this case time. A $C^2$ path is more desirable since a $C^2$ path is continuous in the second derivative (e.g., acceleration). A $C^2$ path is achieved by doubly integrating the accelerations of the root. However due to limitations in the motion capture processes typically used, estimates of the acceleration are typically poor, and are particularly poor at the beginning and end of a basis motion. In another embodiment of the present invention where acceleration data is available at the beginning and the end of a basis motion, the acceleration estimates are doubly integrated creating a $C^2$ path to achieve better overall transition motion results.

The transition motions for the root position 48 in the final composition motion 116 for the example shown in FIG. 5A are determined using the kinematics transition process just described. In FIG. 5, the walk MU 88 defines all the ADOFs for the root position 48.

Transition Motion of Supporting Limbs

The transition motion of supporting limbs (e.g., legs, etc.) are controlled kinematically. Support points are located automatically by finding a link coordinate frame with motion that remains within a small bounding box over an extended period of time. Bounding boxes are known to those in the art. The link coordinate frame is a set of three mutually perpendicular axises rigidly fixed to the link. Typically the user has the option of overriding the link coordinate frame chosen automatically and specifying a user selected link coordinate frame. During the transition a joint coordinate frame (including a user selected link coordinate frame) will be held fixed or constrained using inverse kinematics constraints. The inverse kinematics constraint is enforced by minimizing the deviation for $r_i$ of the constrained link coordinate frame from its desired position with:

$$r_i=(p_i(t)-p'_i(t))^T((p_i(t)-p'_i(t))$$

where $p_i$ is the actual position of the i'th coordinate frame, $p'_i$ is the desired position, and T is the transpose operator. The total error R, over the transition time interval from $t_1$ to $t_2$, is:

$$R = \int_{t_1}^{t_2} \sum_{i=1}^{n} r_i d t$$

This minimization occurs over the entire time interval ($t_1$–$t_2$) during which the support constraint is maintained. R, is also a function of the joint angles in the body:

$$R=f(q_1(t), \ldots, q_n(t))$$

which are themselves functions of B-spline control points defining each joint angle function:

$$q(t)=g(b_1, \ldots, b_m)$$

where $b_1, \ldots, b_m$, are the control points of the B-spline curve for joint angle function $q_j(t)$. R is minimized using the iterative BFGS optimization process which is described in more detail below. The relevant part of the BFGS optimization process requires the gradient R be calculated at each iteration in the optimization:

$$\nabla R = \left[ \frac{\partial R}{\partial b_1}, \ldots, \frac{\partial R}{\partial b_m} \right]$$

$$\frac{\partial R}{\partial b_k} = \int_{t_1}^{t_2} \sum_{i=1}^{n} \frac{\partial r_i}{\partial b_k} dt$$

$$\frac{\partial r_i}{\partial b_k} = 2(p_i(t) - p'_i(t))(u_i \times d_{ij}) \frac{\partial q_j}{\partial b_k}$$

where $U_i$ is the axis of rotation of joint i and $d_{ij}$ is the effective arm of rotation from joint j to joint i.

FIG. 8. shows the effect of using the inverse kinematic constraint process just described to fix the feet of the body of an animated human character on the ground during a motion transition period. FIG. 8A shows the human body model 46 with root position 48, the left leg 142 bent, and the right leg 144 straight from the perspective of a viewer. However, from the perspective of the human body model 46, the right leg 142 is bent, and the left leg 144 is straight. Hereinafter, identifying directions are given from the perspective of a viewer observing the human body model 46.

FIGS. 8B and 8C show expanded views of the lower half of the human body model (i.e., the level of root position 48 level and below) shown in FIG. 8A from the perspective of a viewer. In FIG. 8B, the left leg 142' is constrained to be on the ground during the entire motion transition interval while the right leg 144' is constrained on the ground only at the very end of the motion transition interval. The beginning position of the right leg 144' and the desired ending position 146 of the right leg are shown, and the dashed lines 148 illustrate intermediate portions of the right leg over the motion transition interval. In FIG. 8B the inverse kinematic constraints are satisfied. The left leg 142' remains fixed during the motion transition period and the right leg 144' touches down 146 at the very end of the motion transition interval. In contrast, in FIG. 8C, the inverse kinematic constraints are not applied. As can be seen in FIG. 8C the end position of the left leg drifts 150 from its desired initial fixed position 142''. The end position of the right leg 152 starting from the initial position 144'' fails to meet the desired end position 146'. The intermediate positions of the right leg (including 146',154) and left leg (142'') in FIG. 8C are illustrated by the dashed lines. The unusually rapid and jerky motions described above are illustrated by examining the leg motions (142''-150) and (144''-146''-154-152) in FIG. 8C. These unusually rapid and jerky motions are not seen in and in FIG. 8B (142') and (144'-148-146) when the inverse kinematics constraints process is used.

The transition motion for the supporting limbs (e.g., the legs, etc.) in the final composition motion 116 for the example shown in FIG. 5A, is determined using the inverse kinematic process just described. The walk MU 88 defines all the ADOFs for the joints of the animated graphical human character during the walking motion including the those for the supporting limbs.

Transition Motion of Non-Supporting Limbs

Non-supporting limbs (e.g., arms, etc.) have ADOFs which are undefined during the transition period have their motion generated using a spacetime constraints optimization process. The motion transition mechanism generates motion to span these undefined regions of time which satisfies the boundary conditions at a beginning and an end of a transition period. A good transition will not display any obvious discontinuities at the boundaries of the transition and an assumption is made that minimal or near minimal energy is required to perform the motion between the boundaries.

Common motions, such as walking, are minimal or near minimal energy motions. Highly practiced motions are likely to be minimal energy motions as well, so good transitions typically are determined by the amount of energy needed to make an animated object move along that path.

The energy required to move an animated human character along a path is actually a complex non-linear function of the motion, since in a real person, energy is actually stored in muscles and tendons in one part of the motion and released later on. This has the net effect of reducing the energy required to make the animated 3D human character move. A simplifying assumption that no energy is stored in the body of a real person is used in a preferred embodiment of the present invention. However, other assumptions could also be used. With this assumption, the transition motion of supporting limbs is selected to minimize the input energy which is proportional to the absolute value of the sum of the joint torques necessary to move the body along the joint space path:

minimize $$e = \int_{t_1}^{t_2} \sum_i |\tau_i(t)| dt$$

subject to $q(t_1)=a$ and $q(t_2)=b$
where $\tau_s$ is the torque at joint i and the joint angle vectors a and b are constants determined by the positions of the animated 3D human character at the beginning and end of the transition period. Since a $C^1$ path is desired for a preferred embodiment of the present invention and the optimization process shown above, an alternative formulation is used:

minimize $$e = \int_{t_1}^{t_2} \sum_i \tau_i^2(t) dt$$

subject to $q(t_1)=a$ and $q(t_2)=b$
In a preferred embodiment of the present invention, the BFGS optimization process described by Phillip E. Gill, Walter Murray, and Margaret H. Wright in *Practical Optimization,* Academic Press, 1981, pages 116–127, is used to find a minimum of this integral equation. However, other optimization processes could also be used. The BFGS optimization process belongs to the class of iterative quasi-Newton optimization processes known in the art which progress toward a solution by using the gradient of the objective function:

$$g = \nabla e$$

to incrementally update a matrix decomposition of a pseudo-Hessian matrix H, and to compute a new step direction, d. In the BFGS process the inverse of H is incrementally updated. The new step direction, d, the process will take at each iteration is:

$$d = -H^{-1} g$$

Improving the relative computation required to evaluate g is desirable since it will improve the performance of spacetime with all optimization schemes which require explicit calculation of the gradient. This includes BFGS, the optimization method used is the preferred embodiment.

Since each of the $\tau_i$ is potentially a function of all the $q_j$, $\dot{q}$, $\ddot{q}$, the gradient requires the evaluation of $O(n^2)$ partial derivatives where n is the number of degrees of freedom of the body. If m is the number of B-spline coefficients used to define the time function of each degree of freedom then the pseudo-Hessian is of size nm by nm The update of the pseudo-Hessian and computation of the step direction are both $O((nm)^2)$. For m small, less than 20, and n large, more than 40, the time required to compute g dominates all other computations so an efficient formulation for g achieves the best results in reducing computation.

Computing g requires finding the joint torques and a variety of subsidiary quantities, such as angular velocity and acceleration. This is the inverse dynamics problem which has been extensively studied in the robotics literature known in the art.

Many dynamics formulations have been proposed in the robotics literature ranging from $O(n^4)$ to recursive $O(n)$ processes. In the graphics literature known in the art, $O(e^n)$ process have been used in symbolic spacetime constraint systems. For systems with more than 6 degrees of freedom the recursive $O(n)$ processes are much more efficient.

The inverse dynamics formulation used in a preferred embodiment of the present invention is a modification of the process described by Constantinos A. Balafoutis and Rajnikant V. Patel in "Dynamic Analysis of Robot Manipulators: A Cartesian Sensor Approach," Kluwer Academic Publishers, 1991. In a preferred embodiment of the present invention, the inverse dynamics process is an $O(n)$ recursive formulation which requires 96n-77 multiplications and 84n-77 additions to solve the inverse dynamics problem for a robot manipulator with n joints. This compares to 412n-277 multiplications and 320n-201 additions required by Hollerbach's 3×3 matrix Langragian recursive equations known in the art and reported by Zicheng Liu and Michael F. Cohen in "An Efficient Symbolic Interface to Constraint Based Animation Systems," Proceedings of 5th Eurographics Workshop on Animation and Simulation, 1995. The efficiency of this inverse dynamic formulation process is derived from the use of Cartesian tensors to represent angular velocity and angular acceleration, and from the recursive nature of the computations. These efficiencies carry over to the computation of the gradient terms for graphical animation of a human character.

In a preferred embodiment of the present invention, the recursion of the inverse dynamics formulation proceeds in two steps. In the first step velocities, accelerations, net torques, and forces at each joint in human body model 46 are computed starting from the root node and working out to the tips of all the chains in a kinematics tree. In the second step the joint torques are computed starting from the tips of the chains back to the root node. The recursion is defined below. See Appendix A for an explanation of the symbols used and a complete set of equations.

Initialization:

$$\omega_0^0 = 0, \dot{\omega}_0^0 = 0, \Omega_0^0 = 0, \ddot{s}_{0,0}^0 = -g, A_{n+} = 0,$$

$$z_i^i = [0, 0, 1]^T, J_{C_i}^i = 0.5tr(I_{C_i}^i)1 - I_{C_i}^i$$

Forward Recursion:

$$\omega_{i+}^{i+} = A_{i+}^T \omega_i^i + z_{i+}^{i+} \dot{q}_{i+}$$

$$\dot{\omega}_{i+}^{i+} = A_{i+}^T \dot{\omega}_i^i + \tilde{\omega}_i^{i+} z_{i+}^{i+} \dot{q}_{i+} + z_{i+}^{i+} \ddot{q}_{i+}$$

$$\Omega_{i+}^{i+} = \tilde{\dot{\omega}}_{i+}^{i+} + \tilde{\omega}_{i+}^{i+} \tilde{\omega}_{i+}^{i+}$$

-continued $$\ddot{s}_{0,i+}^{i+} = A_{i+}^T [\ddot{s}_{0,i}^i + \Omega_i^i s_{i,i+}^i]$$

$$\ddot{r}_{0,i+}^{i+} = \Omega_{i+}^{i+} r_{i+,i+}^{i+} + \ddot{s}_{0,i+}^{i+}$$

$$F_{C_{i+}}^{i+} = m_{i+} \ddot{r}_{0,i+}^{i+}$$

$$\tilde{M}_{C_{i+}}^{i+} = \Omega_{i+}^{i+} J_{C_{i+}}^{i+} - [\Omega_{i+}^{i+} J_{C_{i+}}^{i+}]^T$$

$$M_{C_{i+}}^{i+} = \text{dual}(\tilde{M}_{C_{i+}}^{i+})$$

Backward Recursion:

$$f_i^i = F_{C_i}^i + \sum_{i+} [A_{i+} f_{i+}^{i+}]$$

$$\eta_i^i = \tilde{r}_{i,j}^i F_{C_i}^i + M_{C_i}^i + \sum_{i+} [A_{i+} \eta_{i+}^{i+} + \tilde{s}_{i,i+}^i f_{i+}^i]$$

$$\tau_i = \eta_i^i \cdot z_i^i$$

The plus "+" and minus "−" on index variables are used to denote predecessors. Thus, "I−" is the predecessor of I which is the predecessor of "I+". For example, in the equation $\omega_{i+}^{i+} = A_{i+}^T \omega_i^i = z_{i+}^{i+} \dot{q}_{i+}$ the variable $\omega_i^i$ is the angular velocity in the coordinate frame which precedes the joint coordinate frame of $\omega_i^i$. In other words, joint coordinate frame i is closer to the root coordinate frame than is frame $i^+$. Because the articulated system is a tree the successor to a joint coordinate frame may not be unique but the predecessor always will be.

These recursive equations shown above can be differentiated directly to compute g or one can use Cartesian tensor identities to compute the derivatives as is reported by Balafoutis. The partial derivatives and their initial conditions for the recursive equations are included in Appendix A.

The transition motion for the non-supporting limbs (e.g., arm waving arm, etc.) in the undefined regions 106, 108 for the example shown in FIG. 5A and discussed above, are determined using the spacetime constraints optimization process just described. The resulting composition motion 116 in FIG. is a smooth transition from a walking arm motion to an arm wave motion and back to a walking arm motion for the arm (non-supporting limb).

Illustration of Motion Transition

Figure 9A:
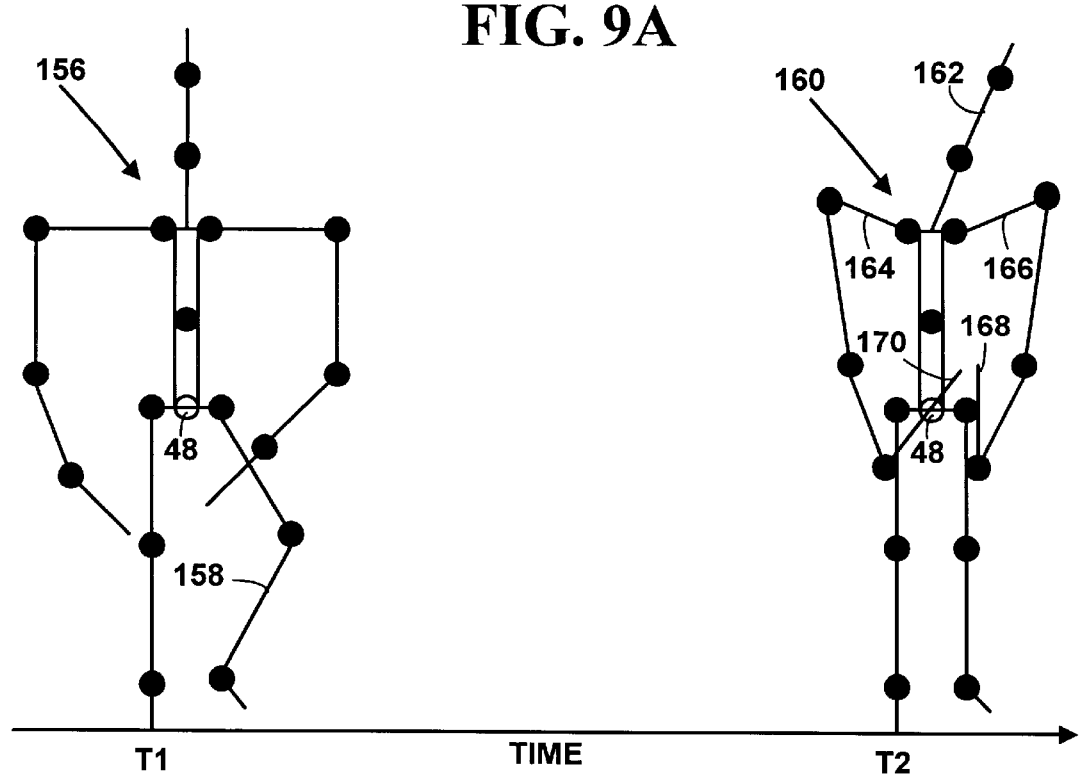
FIG. 9A is a block diagram illustrating character configuration of a human character in a preferred embodiment of the present invention.
Figure 9B:
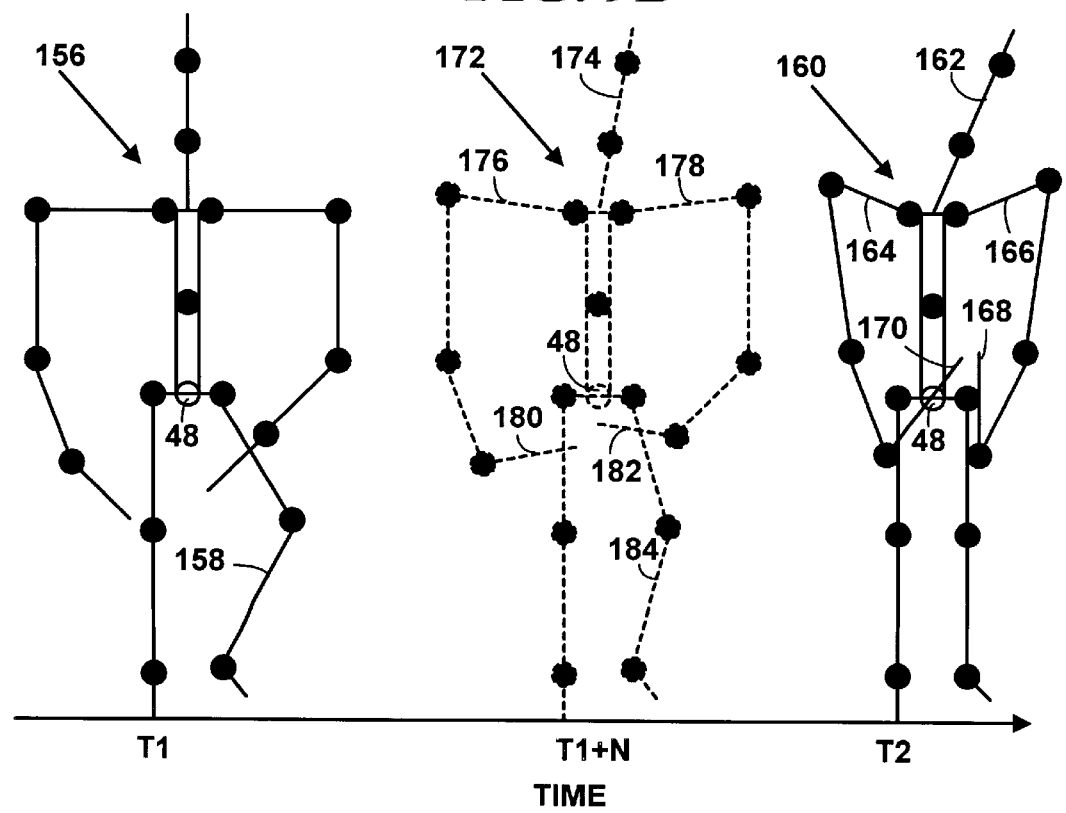

FIGS. 9A and 9B illustrate the results of motion transition 118 process just described. FIG. 9A shows a first animated human character configuration 156 at time T1 (using the human body model 46 and root position 48 from FIG. 3) with the right leg 158 bent from the perspective of a viewer. This animated human character moves to a second character configuration 160 at time T2. The character configuration at time T2 in FIG. 9A has its head segment 162 tipped forward, its should segments 164, 166 bent inward, and two of its arm segments 168, 170 bent upward (e.g., the beginning of a clapping motion).

The first character configuration 156 in FIG. 9A is the end position of a character in a first basis motion at time T1, and the character configuration 160 in FIG. 9A is the start position of a character in a second basis motion at time T2.

With reference to FIG. 9B, the motion transition process 118 described above is used to create motion transitions between the first character configuration 156 and the second character configuration 160 as is illustrated by character configuration 172. The motion transitions created include motion transitions for the root position, the supporting limbs (e.g., the right and left legs), and the non-supporting limbs (e.g., the arms, etc.) from character configuration 156 at time T1, to character configuration 160 at time T2. Multiple intermediate motion transition character configurations are generated to create a set of motion transitions between the two character configurations 156, 160.

One such exemplary intermediate motion transition configuration 172 is shown in FIG. 9B by the character configuration with dashed lines at time T1+N. The head segment 174 of this character configuration 172 is beginning to tip forward, the shoulder segments 176, 178 are beginning to bend inward, two of the arm segments 180, 182 are beginning to bend upward, and the right leg 184 is beginning to straighten out. This intermediate character configuration 172 is only one of the multiple character configurations which are generated to create a smooth transition between the first and second character configurations 156, 160. The motion transitions generated by the motion transition process 118 are used between two or more individual optimized basis motions to create composite motions.

Motion Cyclification

Many desirable basis motions are generally cyclic. For example, walking, running, dribbling a basketball or dribbling a soccer ball, can all be represented as cyclic motions because they can be approximated by multiple repetitions of a basis motion cycle. As represented in un-optimized commercially available basis motion data described above, these are not even approximately cyclic. Such un-optimized basis motion data does not typically include a basis motion cycle from which cyclic motion can be represented. The basis motion cycle preferably has matched position, velocity and acceleration characteristics for each degree of freedom at the start and end of the basis motion cycle. Un-optimized basis motion data do not typically have such matched characteristics, so the position and the first and second derivatives are discontinuous at the start and end of the basis motion cycle. These discontinuities cause a second type of "jerky" transition. For example, if the cyclic motion was an arm wave, the arm may "jump" to a new position at each repetition of the arm wave basis motion. This "jump" is not realistic, and causes the 3D animated human character to exhibit motions a human being could not exhibit.

Figure 10A:
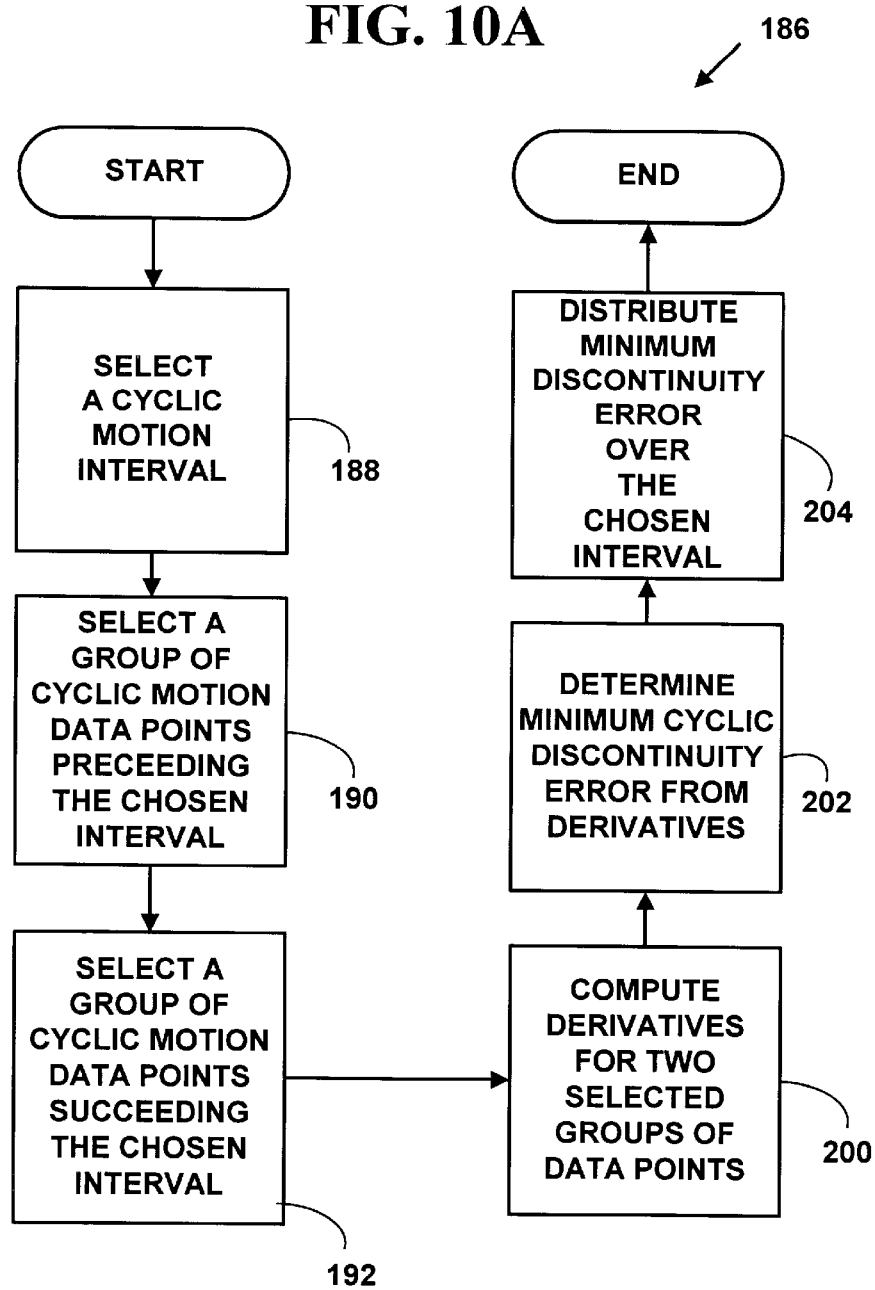
FIG. 10A is a flow diagram illustrating a motion cyclification error reduction process.

In a preferred embodiment of the present invention, FIG. 10A illustrates a cyclification process 186 which reduces cyclic discontinuity errors is used. The user selects the approximate beginning and end of a desired basis motion cycle 188 over a first time interval T1 on raw cyclic basis motion data points. Two sets or regions a and b of motion data points are created centered about the approximated basis motion cycle beginning and end points the user has chosen. If the approximated basis motion cycle chosen by the user has n-number of sample points, then a and b will each be approximately 0.2n-number samples wide. However, other smaller or larger sample sizes for the two regions a and b can also be used.

Region a is created 190 by selecting 0.2n-number of motion data points over a second time interval T2 using the beginning point of time interval T1 chosen by the user as a center point. Half of the motion data points in Region a precede the beginning point of time interval T1 in time. Region b is created 192 by selecting 0.2n-number of motion sample points over a third time interval T3 using the end point of time interval T1 chosen by the user as a center point. Half of the motion data points in Region b succeed the end point of time interval T1 in time. However regions a and b can also be interchanged.

Figure 10B:
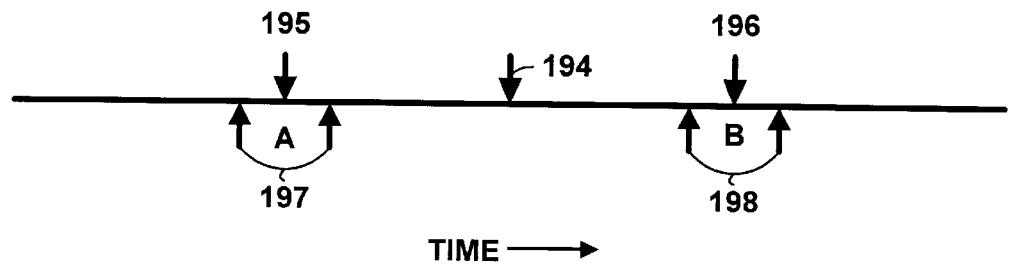
FIG. 10B is a block diagram illustrating motion cyclification intervals.

FIG. 10B shows an exemplary center point 194 of the selected basis motion cycle of n-number of sample points 188 with beginning point 195 and end point 196. Region a 197 comprises 0.2n-number of sample points centered around beginning point 195; 0.1n sample points in time preceding beginning point 195, and 0.1n sample points succeeding beginning point 195. Region b 198 comprises 0.2n-number of sample points centered around end point 196; 0.1n sample points in time preceding end point 196, and 0.1n sample points succeeding end point 196. For example, if n-sample points=1000, then Region a 197 would comprise 100 sample points preceding beginning point 195, and 100 sample points succeeding beginning point 195 since 0.2*1000=200. Region b would comprise 100 sample points preceding end point 196, and 100 sample points succeeding end point 196. However, the value used for n-sample points is typically greater than 1000, so Regions a and b would typically contain more sample points.

Returning to FIG. 10A, the approximate first and second time derivatives are computed 200 using a central differences process at each sample point in a and b. However, processes other than central differences can also be used to compute the derivatives. The pairs of points in a and b are compared to find the two sample points $a_i$, and $b_j$ with the minimum $L^2$ difference 202. The minimum difference is found by:

$$L^2 = \min_{a_j \in I_a, b_j \in I_b} \{\forall\, i\, \forall\, j (a_i - b_j)^T (a_i - b_j)\}$$

where $$a_i = [q(i), \dot{q}(i), \ddot{q}(i)]^T,\ b_j = [q(j), \dot{q}(j), \ddot{q}(j)]^T$$

where $L^2$ finds the minimum squared error between $a_i$ and $b_j$ for all i and j.

The sample points $a_i$ and $b_j$ for which the $L^2$ difference is minimal typically will not be the same as the start and end points of the approximate basis motion cycle selected by the user. In accordance with this invention, the sample points $a_i$ and $b_j$ are substituted for the start and end points selected by the user to provide a reduced discontinuity approximate basis motion cycle over a time interval T1'.

For most motions there will still be a small discontinuity at the start and end of the approximate basis motion cycle. This discontinuity error is distributed in time over the entire time interval T1' 204 by adding a linearly distributed offset to the raw data so that the end points of the approximate cyclic basis motion cycle chosen by the user match. A $C^2$ motion curve is constructed by fitting a least squares cyclic B-spline approximation to the raw data points in the region between sample points $a_i$ and samples point $b_j$. The $C^2$ motion curve distributes the discontinuity error over the entire time interval T1', and the resulting cyclic basis motion defined over time interval T1' has a reduced discontinuity error. This reduced discontinuity error cyclic basis motion can be used with other cyclic or non-cyclic basis motions to create composite motions using the motion transition process 118 described above.

User Interface

Figure 11:
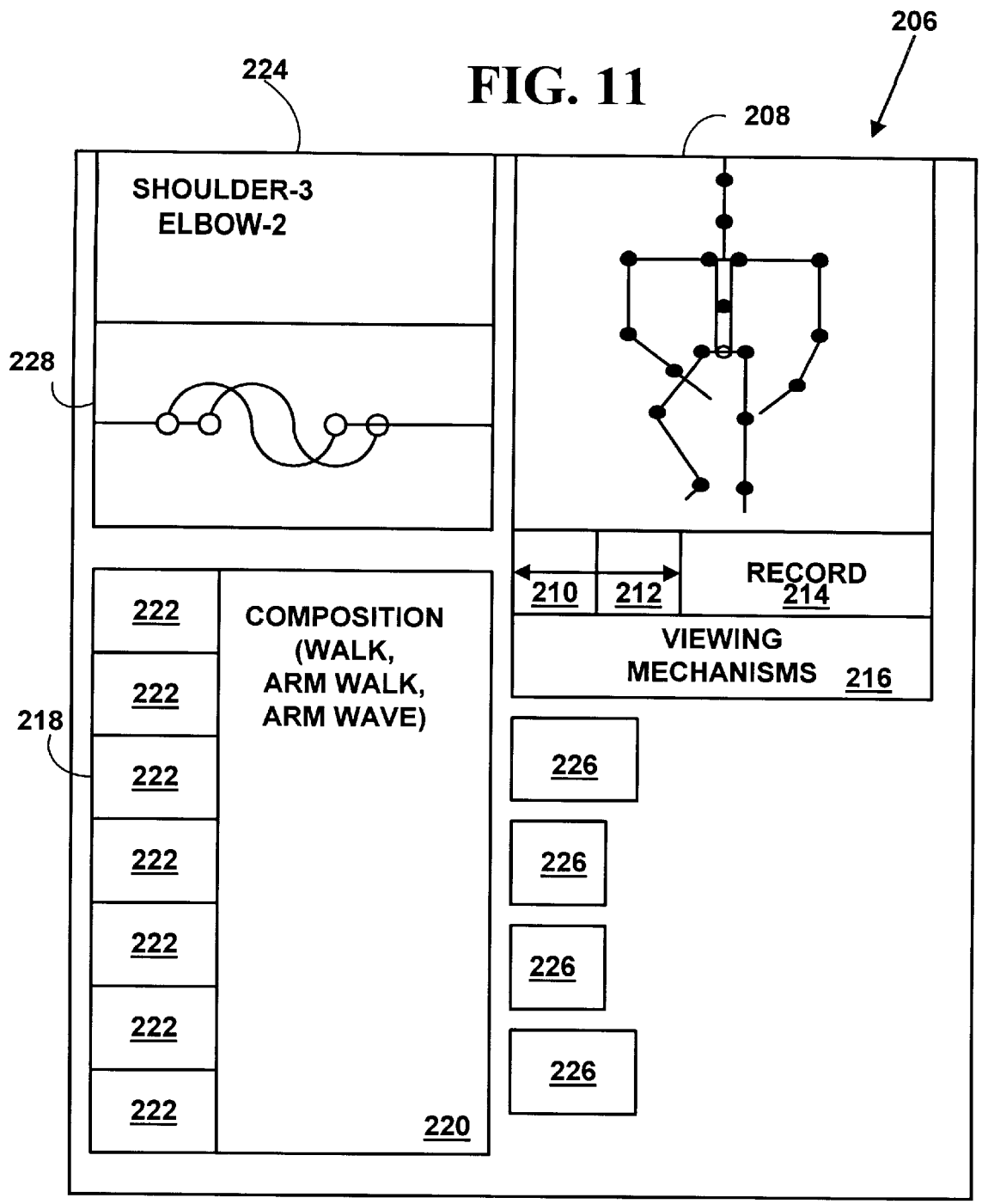
FIG. 11 is a block diagram of a user interface of a preferred embodiment of the present invention.

FIG. 11 is a diagrammatic representation of a computer-controlled display screen showing a user interface 206. The user interface 206 includes a 3D graphics window 208 for viewing the 3D animation with controls for moving backward 210 and forward 212 in time, for recording animation 214 and for selecting several types of viewing mechanisms 216 (e.g., speed, resolution, exposure, etc.). A motion expression editor window 218 displays a current motion algebra expression 220 and has multiple buttons 222 (seven of which are shown in FIG. 11) for the motion algebra operators (e.g., set, function, etc. described above) which can be applied to the expression. A window 224 for selecting the degrees of freedom of the body to be included in a motion, and multiple buttons 226 (four of which are shown) for selecting motion transition and cyclification parameters.

There is also a window 228 that displays basis motion data in a graphical over a selected time interval. However, the user interface 206 can include more or fewer windows, and more or fewer functional buttons.

The user interface 206 allows a user to select multiple basis motions and invoke the motion transition process 118 and the motion cyclicfication processes 186 described above to create a plurality of composition motions. The multiple composite motions are linked or linkable to animate the 3D graphical object.

Animation System

Figure 12:
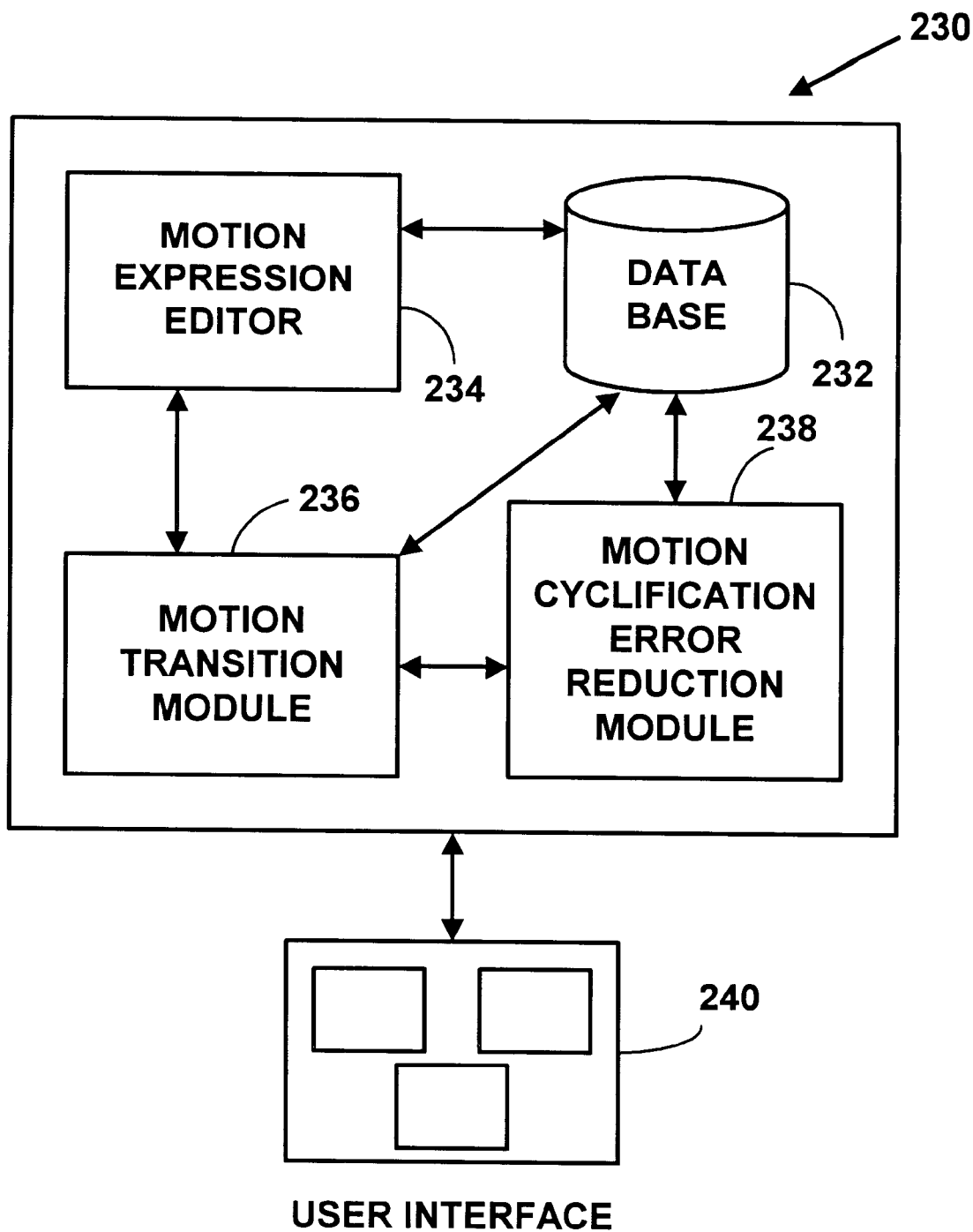
FIG. 12 is a block diagram of a system for a preferred embodiment of the present invention.

FIG. 12 illustrates an animation system 230 of a preferred embodiment of the present invention. The animation system 230 includes a database 232 for storing optimized basis motions, a motion expression editor 234 for manipulating the optimized basis motions, a motion transition module 236 for generating motion transitions between two or more basis motions, a motion cyclification error reduction module 238 for reducing motion cyclicfication errors for selected basis motions, and a user interface 240. However, the animation system 230 can include more or fewer system components.

It should be understood that the programs, processes, and methods described herein are not related or limited to any particular type of computer apparatus, unless indicated otherwise. Various types of general purpose or specialized computer apparatus may be used with or perform operations in accordance with the teachings described herein.

In view of the wide variety of embodiments to which the principles of our invention can be applied, it should be understood that the illustrated embodiments are exemplary only, and should not be taken as limiting the scope of our invention.

Rather, we claim as our invention all such embodiments as come within the scope and spirit of the following claims and equivalents thereto:

We claim:

1. A method of constructing from a set of basis motions for a graphical object, animation motions and transitions between said animation motions, such basis motions optimized through application of motion algebra, the method comprising:

selecting for the graphical object, a computer object model that represents motion capabilities of the graphical object;

applying motion algebra to constrain and minimize the complexity of the set of basis motions;

applying the computer object model to the set of basis motions to create a processed set of basis motions in conformity with the computer object model;

selecting two or more individual basis motions from said processed set of basis motions to create an initial composite motion;

generating a set of motion transitions between the selected basis motions; and assembling a final composite motion from the initial composite motion and the generated set of motion transitions.

2. A computer readable medium having stored therein instructions capable of causing a computer to perform the method of claim 1.

3. The method of claim 1 where the basis motions in the set of basis motions are represented by common degrees of freedom, the computer object model includes fewer degrees of freedom than the common degrees of freedom representing the basis motions, and applying the computer object model to the set of basis motions creates said processed set of basis motions with the same degrees of freedom included in the computer object model.

4. The method of claim 1 where the graphical object is represented by a plurality of moveable joints each with a characteristic motion, the joints interconnecting a plurality of body segments and each of the joints having pre-selected degrees of freedom in the computer object model corresponding to the characteristic motion, the processed set of basis motions including for each joint only the pre-selected degrees of freedom for the joint.

5. The method of claim 1 where the initial and final composite motions are constructed using a motion algebra having optimized motion primitives and motion operations which operate on said optimized motion primitives, the optimized motion primitives including time-based motion intervals, optimized motion degrees of freedom and optimized motion units, and the motion operations including set operations, function operations, and insert and delete operations.

6. The method of claim 5 where the time-based motion intervals include a list of scalar motion functions defined over a time interval, the optimized degrees of freedom include a subset of the degrees of freedom values of the graphical object over the time interval, and the optimized motion units include an array of the optimized degrees of freedom.

7. The method of claim 5 where the set operations include intersection, undefine and composition, and the function operations include affine transformation operations, clip operations, clip-in-place operations and concatenate operations.

8. The method of claim 1 where the computer object model of the graphical object includes a root position, a trunk, and a plurality of appendages connected to said trunk, each appendage having at least one segment coupled at a joint that is moveable, at least one of said appendages being a supporting appendage that supports said trunk and at least one of said appendages being a non-supporting appendage that does not support said trunk, the method further comprising:

generating a first set of optimized motion transition data for the root position with a kinematic optimization process;

generating a second set of optimized motion transition data for the supporting appendage with an inverse kinematics optimization process;

generating a third set of optimized motion transition data for the non-supporting appendage with a spacetime constraints optimization process; and combining the first, second and third sets of motion transition data to generate the set of motion transitions between the selected basis motions.

9. The method of claim 1 where the computer object model for the graphical object includes plural segments coupled at joints that are moveable with plural degrees of freedom, at least selected ones of the joints being moveable in fewer than all the degrees of freedom, the set of basis motions including joint data corresponding to the degrees of freedom, and the applying the computer object model to the set of basis motions to create a processed set of basis motions includes removing joint data for degrees of freedom within which each joint is not moveable.

10. The method of claim 1 where the final composite motion includes visually smooth transitions between the selected basis motions.

11. A method of constructing from a set of basis motions for a graphical object optimized animation motions and transitions between said animation motions, such basis motions optimized through application of motion algebra, the method comprising:

selecting two or more individual basis motions from a set of raw basis motions to create an initial composite motion;

applying motion algebra to constrain and minimize the complexity of the set of basis motions;

generating a set of optimized motion transitions between the selected basis motions; and assembling a final optimized composite motion from the initial composite motion and the generated set of optimized motion transitions.

12. The method of claim 11 where generating a set of optimized motion transitions between the selected basis motions includes using a kinematic optimization process, an inverse kinematic optimization process, and a spacetime constraints optimization process.

13. The method of claim 11 where the set of raw basis motions includes generally cyclic raw basis motions.

14. A method of smoothly transitioning between plural cyclic motion intervals by reducing cyclic discontinuity error in an animation motion for a graphical object, the animation motion including one or more cyclic basis motions, where each of said cyclic basis motions includes a set of cyclic motion data points for a time interval T, the method comprising:

allowing a user to select a first grouping of generally cyclic motion data points with a beginning and ending data point for a first time interval from a basis motion included in the animation motion;

selecting a second grouping of generally cyclic motion data points over a second time interval, the second grouping of generally cyclic motion data points including cyclic motion data points preceding the beginning data point of first time interval, and cyclic motion data points succeeding the beginning data point of the first time interval;

selecting a third grouping of generally cyclic motion data points over a third time interval, the third grouping of generally cyclic motion data points including cyclic motion data points preceding the end data point of first time interval, and cyclic motion data points succeeding the end data point of the first time interval;

determining a minimum cyclic discontinuity error for the first grouping of generally cyclic motion data points with the second and third groupings of generally cyclic motion data points by determining a minimum difference between at least two of the groupings of data points; and distributing the determined minimum cyclic discontinuity error over the first grouping of cyclic motion data points for the first time interval so that transitions between the plural cyclic motion intervals are smoothed.

15. A computer readable medium having stored therein computer programming instructions for causing a computer to perform the method of claim 14.

16. The method of claim 14 where the first grouping of generally cyclic motion data points for the first time interval includes at least one cycle of generally cyclic motion.

17. The method of claim 14 where N-number of generally cyclic motion data points are included in the first grouping of generally cyclic motion data points and selecting the second grouping of generally cyclic motion data points over the second time interval includes selecting less than N-number of generally cyclic data points.

18. The method of claim 14 where N-number of generally cyclic motion data points are included in the first grouping of generally cyclic motion data points and selecting the third grouping of cyclic motion data points over the third time interval includes selecting less than N-number of generally cyclic data points.

19. The method of claim 14 where each generally cyclic motion data point in the selected second and third groupings of generally cyclic motion data points step includes position information of the graphical object at a selected time and determining a minimum cyclic discontinuity error with the selected second and third groupings of generally cyclic motion data points includes:

computing a time derivative for each cyclic motion data point in the selected second grouping of generally cyclic motion data points;

computing a time derivative for each cyclic motion data point in the selected third grouping of generally cyclic motion data points;

comparing the computed time derivatives for the second grouping of generally cyclic motion data points to the computed time derivatives for the third grouping of generally cyclic motion data points to identify a pair of cyclic motion data point time derivatives from the second and third groupings of generally cyclic motion data points with a minimum difference between them.

20. The method of claim 19 where computing time derivatives includes computing the first and second time derivatives for each generally cyclic motion data point.

21. The method of claim 14 where distributing the determined minimum cyclic discontinuity error over the first grouping of generally cyclic motion data points for the first time interval includes:

adding a proportional fraction of the determined minimum cyclic discontinuity error to each generally cyclic motion data point in the selected first grouping of cyclic motion data points for the first time interval to create an initial set of reduced discontinuity error cyclic motion data points for the first time interval; and approximating a final set of reduced discontinuity error cyclic motion data points for the first time interval from the initial set of reduced discontinuity error cyclic motion data points with a motion approximation process.

22. The method of claim 21 where the motion approximation process includes fitting a least squares cyclic B-spline approximation between the cyclic motion data points in the first set of generally cyclic motion data points.

23. A method of constructing an optimized computer object model for a graphical object from a general computer object model that includes plural body segments coupled at segment joints that are moveable with plural degrees of freedom, at least selected ones of the segment joints being moveable in fewer than all the degrees of freedom, the method comprising:

(a) identifying a segment joint moveable in fewer than all the degrees of freedom;

(b) removing joint data corresponding to the degrees of freedom in which the segment joint is not moveable;

(c) repeating steps (a)–(b) until joint data corresponding to the degrees of freedom in which each segment joint is not moveable has been removed;

wherein the optimized computer object model includes the segment joints for a human body model with 44 degrees of freedom, in which at least one such segment joint is moveable in 3 angular degrees of freedom, and another such joint is not moveable in 3 angular degrees of freedom.

24. A method according to claim 23,
wherein the optimized human body model includes a root position.

25. The method of claim 24 where the root position is defined by 3 angular degrees of freedom and 3 positional degrees of freedom.

26. A method of constructing from a set of optimized basis motions for a graphical object, animation motions and smooth transitions between said animation motions, where at least one of said optimized basis motions is a generally cyclic basis motion, the method comprising:

selecting a first optimized basis motion from the set of optimized basis motions;

selecting a second optimized basis motion from the set of optimized basis motions where the second optimized basis motion is a generally cyclic basis motion;

generating a third optimized basis motion from the second basis motion by reducing cyclic discontinuity errors in the second optimized basis motion, where reduction of discontinuity errors includes applying motion algebra to determine a minimum difference between the first and second optimized basis motions;

generating a set of motion transitions between the first and third optimized basis motions; and assembling a composite motion from the first and third optimized composite motions and the generated set of motion transitions.

27. The method of claim 26 where the optimized cyclic basis motion includes a set of generally cyclic motion data points for a time interval T, further comprising:

allowing a user to select a first grouping of generally cyclic motion data points with a beginning and ending data point for a first time interval from a basis motion included in the animation motion;

selecting a second grouping of generally cyclic motion data points over a second time interval, the second grouping of generally cyclic motion data points including cyclic motion data points preceding the beginning data point of first time interval, and cyclic motion data points succeeding the beginning data point of the first time interval;

selecting a third grouping of generally cyclic motion data points over a third time interval, the third grouping of generally cyclic motion data points including cyclic motion data points preceding the end data point of first time interval, and cyclic motion data points succeeding the end data point of the first time interval;

determining a minimum cyclic discontinuity error for the first grouping of generally cyclic motion data points with the second and third groupings of generally cyclic motion data points; and distributing the determined minimum cyclic discontinuity error over the first grouping of cyclic motion data points for the first time interval.

28. The method of claim 26 where the graphical object includes a root position, a trunk, a plurality of appendages connected to said trunk, each appendage having a plurality of segments coupled at joints, at least one of said appendages a non-supporting appendage which is not supporting said trunk, and at least one of said appendages a supporting appendage which is supporting said trunk, the method further comprising:

generating a first set of optimized motion data for the root position over a time interval;

generating a second set of optimized motion data for the non-supporting appendage over the time interval;

generating a third set of optimized motion data for the supporting appendage over the time interval; and assembling said first, second and third sets of optimized data to create an optimized motion transition.

29. A method of constructing from a set of basis motions for a graphical object, animation motions and transitions between said animation motions, the method comprising:

selecting two individual basis motions from a set of basis motions, where one such individual basis motion is a generally cyclic basis motion with reduced cyclic discontinuity error;

generating a set of motion transitions between the selected basis motions by applying motion algebra to such basis motions so as to determine a smooth transition between such basis motions; and assembling a composite motion from the generated set of motion transitions and the selected basis motions.

30. The method of claim 29 where the generally cyclic basis motion with reduced discontinuity error is created by distributing a determined minimum cyclic discontinuity error over all data points comprising the generally cyclic basis motion.

* * * * *

UNITED STATES PATENT AND TRADEMARK OFFICE
CERTIFICATE OF CORRECTION

PATENT NO.    : 5,982,389

DATED         : November 9, 1999

INVENTOR(S)   : Guenter et al.

It is certified that error appears in the above-identified patent and that said Letters Patent is hereby corrected as shown below:

| Col./Line | Error Reads | Should Read |
|---|---|---|
| 7/18 | Optimizing basis motion data | Move to make new subheading and paragraph at line 18 |
| 9/54 | operation is | operation " ^ " is |
| 10/64 | tend | $t_{end}$ |
| 12/39 | unction | function |
| 12/41 | $(q_1)(t)$ | $(q_1(t)$ |
| 13/56 | They component | The y component |
| 14/60 | q(t) | $q_j(t)$ |
| 15/46 | 146" | 146' |
| 15/2 | $\tau_s$ | $\tau_i$ |
| 20/20 | $a_j$ | $a_i$ |

Signed and Sealed this

Tenth Day of April, 2001

Attest:

NICHOLAS P. GODICI

*Attesting Officer*   *Acting Director of the United States Patent and Trademark Office*